US012627534B2

(12) United States Patent
Yan et al.

(10) Patent No.: US 12,627,534 B2
(45) Date of Patent: May 12, 2026

(54) CHANNEL SOUNDING METHOD AND APPARATUS

(71) Applicant: HUAWEI TECHNOLOGIES CO., LTD., Shenzhen (CN)

(72) Inventors: Zhongjiang Yan, Xi'an (CN); Mao Yang, Xi'an (CN); Dandan Liang, Shenzhen (CN); Jian Yu, Shenzhen (CN); Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 17/899,967

(22) Filed: Aug. 31, 2022

(65) Prior Publication Data

US 2022/0417063 A1 Dec. 29, 2022

Related U.S. Application Data

(63) Continuation of application No. PCT/CN2021/077231, filed on Feb. 22, 2021.

(30) Foreign Application Priority Data

Mar. 2, 2020 (CN) .......................... 202010135651.7

(51) Int. Cl.
| | |
|---|---|
| *H04L 25/02* | (2006.01) |
| *H04B 7/0417* | (2017.01) |
| *H04B 7/06* | (2006.01) |

(52) U.S. Cl.
CPC ....... *H04L 25/0228* (2013.01); *H04B 7/0417* (2013.01); *H04B 7/0626* (2013.01)

(58) Field of Classification Search
CPC .. H04B 7/0417; H04B 7/0626; H04L 25/0228
See application file for complete search history.

(56) References Cited

U.S. PATENT DOCUMENTS

| | | | | |
|---|---|---|---|---|
| 11,108,442 B1* | 8/2021 | Tian | ........................ | H04B 17/12 |
| 2012/0014349 A1* | 1/2012 | Chung | .............. | H04W 72/0453 |
| | | | | 370/329 |

(Continued)

FOREIGN PATENT DOCUMENTS

| | | |
|---|---|---|
| CN | 201341028 Y | 11/2009 |
| CN | 101982922 A | 3/2011 |

(Continued)

OTHER PUBLICATIONS

IEEE802.11-2012 Part 11:Wireless LAN Medium Access Control(MAC) and Physical Layer(PHY) Specifications, IEEE Computer Society, dated Mar. 29, 2012, total 2793 pages.

(Continued)

*Primary Examiner* — David B Lugo
(74) *Attorney, Agent, or Firm* — HAUPTMAN HAM, LLP

(57) ABSTRACT

This application provides a channel sounding method and apparatus. The method includes: A first communication device sends a first frame to a second communication device, where the first frame is used to indicate the second communication device to perform channel sounding on a part of antennas of the first communication device. The first communication device sends a second frame to the second communication device, where the second frame is used by the second communication device to perform channel sounding on the part of antennas. The first communication device receives a third frame from the second communication device, where the third frame is used to indicate a result of performing channel sounding on the part of antennas.

20 Claims, 17 Drawing Sheets

(56) References Cited

U.S. PATENT DOCUMENTS

| 2017/0195026 | A1* | 7/2017 | Ghosh .................. H04B 7/0617 |
|---|---|---|---|
| 2018/0254812 | A1 | 9/2018 | Park et al. |
| 2018/0351620 | A1 | 12/2018 | Su et al. |
| 2019/0115970 | A1* | 4/2019 | Vermani ............... H04L 5/0023 |
| 2019/0349067 | A1 | 11/2019 | Huang et al. |
| 2020/0112350 | A1* | 4/2020 | Yang .................... H04B 7/0421 |
| 2020/0358486 | A1* | 11/2020 | Suh ..................... H04L 27/2602 |
| 2020/0403674 | A1* | 12/2020 | Li .......................... H04B 17/24 |
| 2021/0044333 | A1* | 2/2021 | Jiang ................... H04B 7/0619 |
| 2021/0058936 | A1* | 2/2021 | Gordaychik .......... H04W 72/23 |
| 2021/0409078 | A1* | 12/2021 | Jeon ........................ H04L 69/08 |
| 2022/0123887 | A1* | 4/2022 | Zander ................ H04B 7/0617 |

FOREIGN PATENT DOCUMENTS

| CN | 105409156 | A | 3/2016 |
|---|---|---|---|
| CN | 108886395 | A | 11/2018 |
| CN | 109474034 | A | 3/2019 |
| CN | 110224457 | A | 9/2019 |
| EP | 3525511 | A1 | 8/2019 |
| JP | H08116604 | A | 5/1996 |

OTHER PUBLICATIONS

EEE P802.11az /D1.0, Feb. 2019, P802.11az /D1.0, Draft Standard for Information technology Telecommunications and information exchange between systems Local and metropolitan area networks Specific requirements, Part 11: Wireless LAN Medium Access Control , (MAC) and Physical Layer (PHY) Specifications, Amendment 3: Enhancements for positioning, 187 pages.

International Search Report issued in corresponding International Application No. PCT/CN2021/078659, dated Jun. 4, 2021, pp. 1-9.

India Examination Report issued in corresponding India Application No. 202237051588, dated Feb. 16, 2023, pp. 1-6.

Extended European Search Report issued in corresponding European Application No. 21764414.5, dated Jun. 27, 2023, pp. 1-11.

Kosuke Aio (Sony Corporation), Consideration of Multi-AP Sounding, IEEE 802.11-19/1134r1, IEEE, Internet URL: https://mentor.ieee.org/802.11/dcn/19/11-19-1134-01-00 be-consideration-of-multi-ap-sounding.pptx, Aug. 8, 2019, total 14 pages.

Jianhan Liu (Mediatek), Joint Sounding for Multi-AP Systems and IEEE 802.11-19/1593r3, and IEEE, Internet URL: https://mentor.ieee.org/802.11/dcn/19/11-19-1593-03-00 be-joint-sounding-for-multi-ap-systems.pptx, Nov. 13, 2019, total 20 pages.

Japanese Office Action issued in corresponding Japanese Application No. 2022-552567, dated Nov. 14, 2023, pp. 1-7.

Japanese Office Action issued in corresponding Japanese Application No. 2022-552567, dated May 7, 2024, pp. 1-5.

European Office Action issued in corresponding European Application No. 21764414.5, dated Jan. 19, 2026, pp. 1-14.

* cited by examiner

| MAC | | Memory | Scheduler |
|---|---|---|---|
| PHY | | Controller | Processor |
| Radio frequency/ Antenna | | | |

Figure 8:
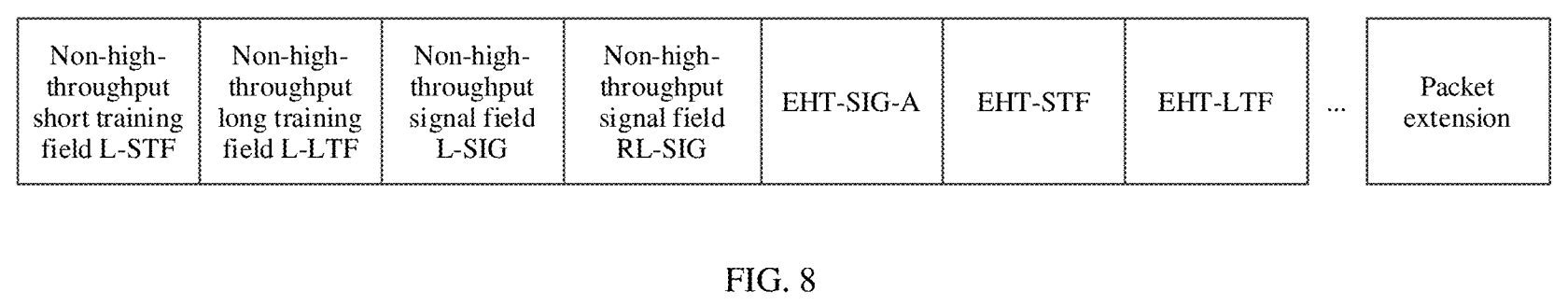

| Non-high-throughput short training field L-STF | Non-high-throughput long training field L-LTF | Non-high-throughput signal field L-SIG | Non-high-throughput signal field RL-SIG | EHT-SIG-A | EHT-STF | EHT-LTF | ... | Packet extension |

| Bit quantity: 3 | 3 | 2 | 1 | 1 | 2 | 3 | 1 | 7 | 7 | 6 | 4 |
|---|---|---|---|---|---|---|---|---|---|---|---|
| Guidance on a number of columns | Guidance on a number of rows | Bandwidth width | Grouping | Codebook information | Feedback type | Remaining feedback segment | First feedback segment | Resource unit start index | Resource unit end index | Sounding dialog token number | Reserved |

FIG. 10

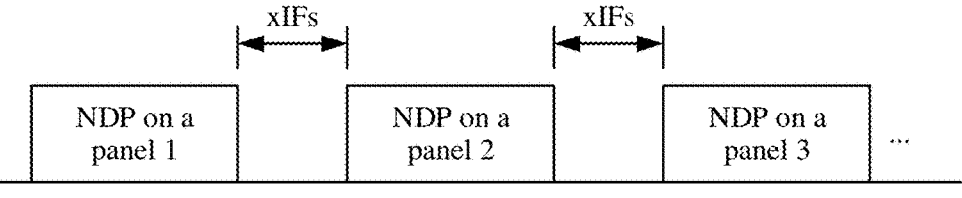

|  |  | xIFs |  |  | xIFs |  |  |
|---|---|---|---|---|---|---|---|

| NDP on a panel 1 | | NDP on a panel 2 | | NDP on a panel 3 | ··· |

FIG. 17

Reuse an NDPA.

The panel training trigger frame is a new type of trigger frame, and may include a maximum quantity of panels that are fed back Feed back an optimal panel. For example, a STA 1 feeds back only the panel 1, and a STA 2 feeds back the panel 1 and the panel 2

| Pre-training frame (optional) | NDP | Panel training trigger frame TF-PTP | Panel training feedback PTFB | ~~ |
|---|---|---|---|---|
|  |  |  | Panel training feedback PTFB | |

| Non-high-throughput short training field L-STF | Non-high-throughput long training field L-LTF | ··· | EHT LTF on a panel 1 | EHT LTF on a panel 2 | ··· | EHT LTF on a panel n | ··· |

All antennas that belong to the panel 1 simultaneously send an LTF signal

FIG. 18

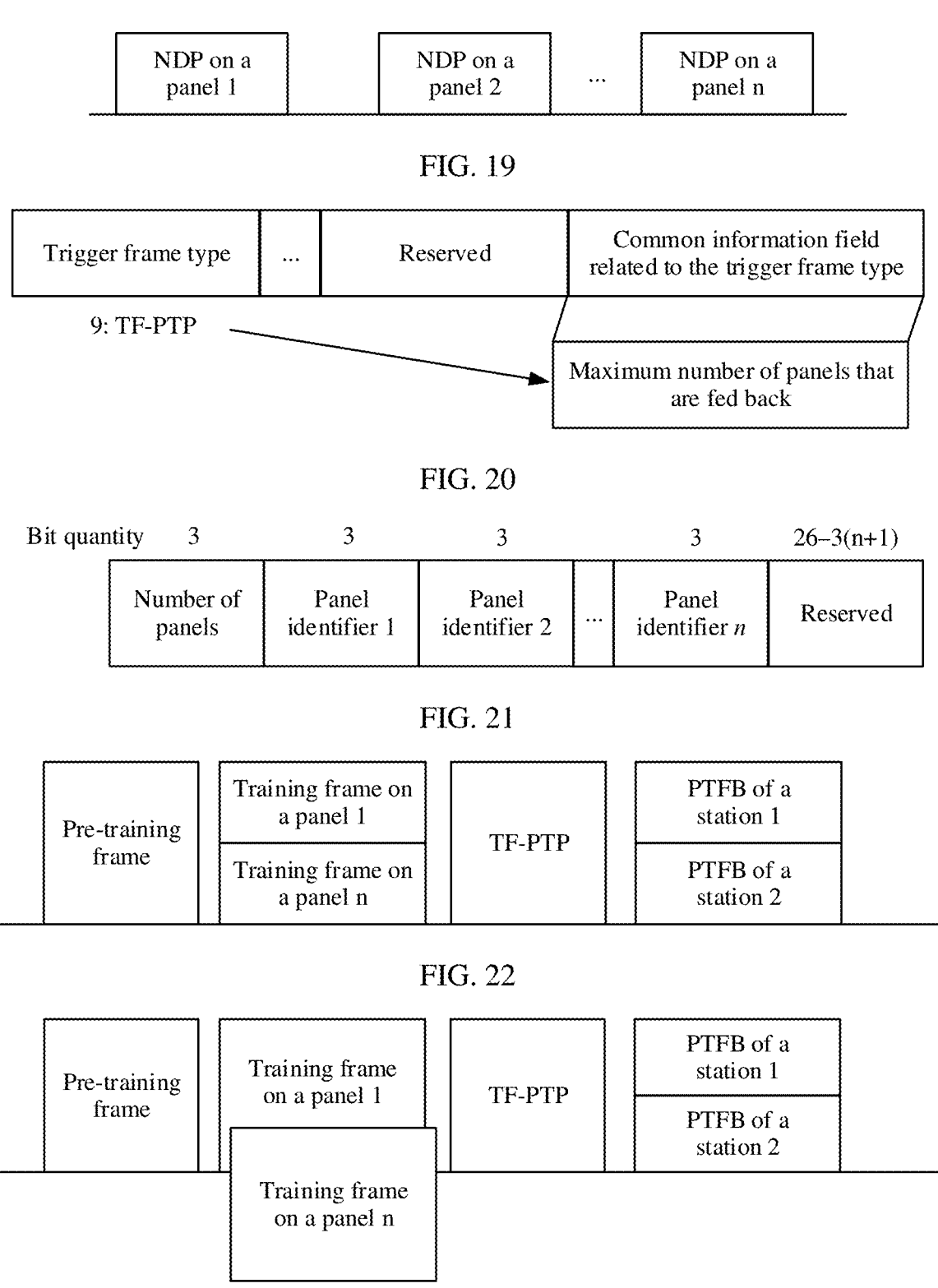

| NDP on a panel 1 | NDP on a panel 2 | ... | NDP on a panel n |

FIG. 19

| Trigger frame type | ... | Reserved | Common information field related to the trigger frame type |

9: TF-PTP

| Maximum number of panels that are fed back |

FIG. 20

| Bit quantity | 3 | 3 | 3 | | 3 | 26–3(n+1) |
| --- | --- | --- | --- | --- | --- | --- |
| | Number of panels | Panel identifier 1 | Panel identifier 2 | ... | Panel identifier $n$ | Reserved |

FIG. 21

| Pre-training frame | Training frame on a panel 1 / Training frame on a panel n | TF-PTP | PTFB of a station 1 / PTFB of a station 2 |

FIG. 22

| Pre-training frame | Training frame on a panel 1 / Training frame on a panel n | TF-PTP | PTFB of a station 1 / PTFB of a station 2 |

FIG. 23

CHANNEL SOUNDING METHOD AND APPARATUS

STATEMENT OF JOINT RESEARCH AGREEMENT

The subject matter and the claimed invention were made by or on the behalf of Northwestern Polytechnical University and Huawei Technologies Co., Ltd., of Shenzhen, Guangdong Province, P.R. China, under a joint research agreement titled "Research project on key technologies of next generation Wi-Fi MAC". The joint research agreement was in effect on or before the claimed invention was made, and that the claimed invention was made as a result of activities undertaken within the scope of the joint research agreement.

CROSS-REFERENCE TO RELATED APPLICATIONS

This application claims is a continuation of International Patent Application No. PCT/CN2021/077231, filed on Feb. 22, 2021, which priority to Chinese Patent Application No. 202010135651.7, filed on Mar. 2, 2020. The disclosures of the aforementioned applications are hereby incorporated by reference in their entireties.

TECHNICAL FIELD

This application relates to the communication field, and more specifically, to a channel sounding method and apparatus.

BACKGROUND

The Institute of Electrical and Electronics Engineers ((institute of electrical and electronic engineers, IEEE) 802.11) standard discusses a next-generation extremely high throughput (extremely high throughput, EHT) working group for IEEE 802.11ax, and considers introducing larger bandwidth (for example, 320 MHz) and more streams (for example, 16 spatial streams) in a next-generation wireless local area network (wireless local area network, WLAN). For the EHT, a throughput is to be improved by increasing spatial streams. However, due to a limitation of a capability of a wireless device, a single access point (access point, AP) can hardly provide 16 spatial streams.

To resolve the foregoing problems, a multi-panel multi-input multi-output (multi-panel multiple input multiple output, MP MIMO) technology emerges. MP MIMO means that a wireless device (for example, a base station in a cellular network, an AP in a WLAN, or a terminal device) is formed by interconnecting a plurality of panels. A series of transceiver antennas are mounted on each panel. That is, antenna resources of one wireless device are scattered on a plurality of panels that are close to or far away from each other. MP MIMO can reduce deployment costs and complexity of numerous antennas and improve scalability, a network coverage capability, and a multiple input multiple output (multiple input multiple output, MIMO) channel gain. MP MIMO provides a feasible solution to use of more streams or antenna resources for a next-generation WLAN.

However, regardless of whether the antenna resources are centralized or located on a plurality of panels, a technical premise for using the MIMO technology in the WLAN is a channel sounding process. That is, the AP can serve one or more stations (station, STA) in a MIMO manner through a plurality of antennas only after a non-AP station (non-AP station, non-AP STA) completes channel sounding with the AP and feeds back a channel sounding result. More channel state feedback information is required if larger bandwidth and more spatial streams are introduced. This causes higher feedback overheads.

Therefore, how to reduce channel state information feedback overheads becomes an urgent problem to be resolved.

SUMMARY

This application provides a channel sounding method and apparatus, to reduce channel state information feedback overheads.

According to a first aspect, this application provides a channel sounding method. The method includes: A first communication device sends a first frame to a second communication device, where the first frame is used to indicate the second communication device to perform channel sounding on a part of antennas of the first communication device. The first communication device sends a second frame to the second communication device, where the second frame is used by the second communication device to perform channel sounding on the part of antennas. The first communication device receives a third frame from the second communication device, where the third frame is used to indicate a result of performing channel sounding on the part of antennas.

Optionally, the part of antennas may be a predetermined antenna that can well communicate with the second communication device, for example, may be an antenna that is in predetermined antennas of the first communication device and that can well communicate with the second communication device.

Optionally, the part of antennas may be an antenna predetermined for communicating with the second communication device.

Correspondingly, there are many manners in which the first frame indicates the foregoing part of antennas. For example, the first frame indicates, based on one or more panel identifiers, the second communication device to perform channel sounding on an antenna corresponding to the one or more panel identifiers. For another example, the first frame indicates, based on one or more AP identifiers, the second communication device to perform channel sounding on an antenna corresponding to the one or more AP identifiers. For another example, the first frame uses an index directly indicating an antenna to indicate the part of antennas. For another example, the first frame uses an index of a start antenna and an index of an end antenna to indicate the part of antennas. For another example, the first frame uses an index of a start antenna and an antenna quantity to indicate the part of antennas.

Based on the foregoing technical solution, the first communication device may indicate, to the second communication device, a part of antennas on which channel measurement needs to be performed by the second communication device, and the second communication device performs channel sounding only on a corresponding panel and feeds back a channel sounding result. This can reduce channel state information feedback overheads compared with a case of performing channel sounding on all the antennas of the first communication device and feeding back channel sounding results each time.

With reference to the first aspect, in a possible implementation, before the first communication device receives the third frame from the second communication device, the method further includes: The first communication device sends a fourth frame to the second communication device. The fourth frame is used to indicate the second communication device to send the third frame to the first communication device.

Based on the foregoing technical solution, the first communication device may trigger, based on the fourth frame, at least one second communication device to simultaneously feed back a third frame. This helps improve channel sounding efficiency.

With reference to the first aspect or any one of the foregoing possible implementations, in another possible implementation, before the first communication device sends the first frame to the second communication device, the method further includes: The first communication device sends a training frame to the second communication device, where the training frame is used to perform channel sounding on all the antennas of the first communication device. The first communication device receives a feedback frame from the second communication device. The first communication device determines the part of antennas based on the feedback frame.

Based on the foregoing technical solution, an antenna set for communication with the second communication device may be predetermined based on an actual channel condition or the like. This helps increase a success probability of subsequent communication between the first communication device and the second communication device.

With reference to the first aspect or any one of the foregoing possible implementations, in another possible implementation, before the first communication device sends the training frame to the second communication device, the method further includes: The first communication device sends a pre-training frame to the second communication device. The pre-training frame is used to indicate the second communication device to perform channel sounding on all the antennas of the first communication device.

Based on the foregoing technical solution, the second communication device can be indicated in advance to prepare for channel sounding, so that the second communication device prepares for channel sounding in a timely manner. This helps improve channel sounding efficiency.

With reference to the first aspect or any one of the foregoing possible implementations, in another possible implementation, before the first communication device receives the feedback frame from the second communication device, the method further includes: The first communication device sends a trigger frame to the second communication device. The trigger frame is used to indicate the second communication device to send the feedback frame to the first communication device.

With reference to the first aspect or any one of the foregoing possible implementations, in another possible implementation, the first frame includes a first field. The first field is used to indicate a part of panels of the first communication device, and the part of antennas includes an antenna corresponding to the part of panels.

Optionally, the first field may be used to carry a panel bitmap. The panel bitmap is used to indicate the part of panels of the first communication device. For example, when antennas of the first communication device are distributed on a panel 1 to a panel 4, four bits may be used in the panel bitmap to represent the four panels. For example, 1001 indicates that antennas on the panel 1 and the panel 4 are antennas on which channel sounding needs to be performed this time.

Optionally, different values of the first field may alternatively be used to represent different panel combinations. For example, when antennas of the first communication device are distributed on a panel 1 to a panel 4, and the first field includes four bits, a value 1111 of the first field represents the panel 1 to the panel 3, and a value 1010 of the first field represents the panel 1 and the panel 2.

Optionally, the first field may alternatively indicate an index of a panel directly.

In the foregoing technical solution, a part of panels of the first communication device is indicated, to indirectly indicate a part of antennas on which channel sounding needs to be performed. In other words, the foregoing technical solution may be applied to a scenario of channel sounding for a communication device configured with a plurality of panels.

With reference to the first aspect or any one of the foregoing possible implementations, in another possible implementation, the first frame includes a first field. The first field is used to carry an antenna index, and the antenna index is used to indicate the part of antennas.

Optionally, the first frame uses an index directly indicating an antenna to indicate the part of antennas.

Optionally, the first frame uses an index of a start antenna and an index of an end antenna to indicate the part of antennas.

Optionally, the first frame uses an index of a start antenna and an antenna quantity to indicate the part of antennas.

With reference to the first aspect or any one of the foregoing possible implementations, in another possible implementation, the first frame further includes a second field. The second field is used to indicate that the first field is used to indicate a part of panels of the first communication device or carry an antenna index.

That is, the first communication device may notify the second communication device that a current scenario is an MP MIMO scenario. In this way, communication between the first communication device and the second communication device can be adapted to different scenarios.

With reference to the first aspect or any one of the foregoing possible implementations, in another possible implementation, the first frame includes a third field. The third field is used to indicate that the first frame is a frame of an extremely high throughput EHT variant.

Optionally, the third field may be one or more bits in a sounding dialog token field.

For example, the third field includes a standard control field including bits of a ranging field and an HE field in the sounding dialog token field. When a value of the standard control field is 00, it indicates that the first frame is a frame of a VHT variant; when a value of the standard control field is 01, it indicates that the first frame is a frame of an HE variant; when a value of the standard control field is 10, it indicates that the first frame is a frame of an EHT variant; or when a value of the standard control field is 11, it indicates that the first frame is a frame of a ranging variant. Alternatively, when a value of the standard control field is 00, it indicates that the first frame is a frame of a VHT variant; when a value of the standard control field is 01, it indicates that the first frame is a frame of an HE variant; when a value of the standard control field is 10, it indicates that the first frame is a frame of a ranging variant; or when a value of the standard control field is 11, it indicates that the first frame is a frame of an EHT variant.

Optionally, the third field includes a standard control field including bits of a ranging field and an HE field in the sounding dialog token field, and one or more bits in a station information field. When a value of the standard control field is 00, it indicates that the first frame is a frame of a VHT variant or a frame of an EHT variant; when a value of the standard control field is 01, it indicates that the first frame is a frame of an HE variant; when a value of the standard control field is 10, it indicates that the first frame is a frame of a ranging variant; or when a value of the standard control field is 11, it indicates that the first frame is invalid or reserved for future use. When the value of the standard control field is 00, it indicates that the first frame is the frame of the VHT variant or the frame of the EHT variant. Therefore, distinguishing may be further performed based on one or more bits in the station information field.

In an example, one bit in the station information field may be occupied, and the bit is used to further indicate whether the first frame is a frame of a VHT variant or a frame of an EHT variant.

For example, a new disambiguation field may be set in the station information field. When a value of the disambiguation field is 0, it indicates that the first frame is a frame of a VHT variant; or when a value of the disambiguation field is 1, it indicates that the first frame is a frame of an EHT variant. Alternatively, when a value of the disambiguation field is 1, it indicates that the first frame is a frame of a VHT variant; or when a value of the disambiguation field is 0, it indicates that the first frame is a frame of an EHT variant.

For another example, one bit in an association identifier field may be used to further indicate whether the first frame is a frame of a VHT variant or a frame of an EHT variant. When a value of the bit is 0, it indicates that the first frame is a frame of a VHT variant; or when a value of the bit is 1, it indicates that the first frame is a frame of an EHT variant. Alternatively, when a value of the bit is 1, it indicates that the first frame is a frame of a VHT variant; or when a value of the bit is 0, it indicates that the first frame is a frame of an EHT variant.

For another example, a value of a special association identifier may be used to further indicate whether the first frame is a frame of a VHT variant or a frame of an EHT variant. For example, when a value of the association identifier is 2044, it indicates that the first frame is a frame of a VHT variant; or when a value of the association identifier is 2043, it indicates that the first frame is a frame of an EHT variant.

With reference to the first aspect or any one of the foregoing possible implementations, in another possible implementation, the second frame includes an extremely high throughput EHT signal field, an EHT short training field, and an EHT long training field. The EHT long training field includes a long training field of each of the part of antennas.

With reference to the first aspect or any one of the foregoing possible implementations, in another possible implementation, the second frame includes an extremely high throughput EHT signal field, an EHT short training field, and an EHT long training field. The part of antennas corresponds to at least two panels, the second frame includes at least two second subframes, and the EHT long training field in the second subframe includes a long training field of an antenna corresponding to one of the at least two antenna panels.

With reference to the first aspect or any one of the foregoing possible implementations, in another possible implementation, the first frame is a null data packet announcement NDPA frame, the second frame is a null data packet NDP frame, the third frame is a beamforming report frame, and the fourth frame is a trigger frame.

With reference to the first aspect or any one of the foregoing possible implementations, in another possible implementation, the first communication device is an access point AP, and the second communication device is a station STA.

According to a second aspect, this application provides a channel sounding method. The method includes: A second communication device receives a first frame from a first communication device, where the first frame is used to indicate the second communication device to perform channel sounding on a part of antennas of the first communication device. The second communication device receives a second frame sent by the first communication device, where the second frame is used by the second communication device to perform channel sounding on the part of antennas. The second communication device performs channel sounding on the part of antennas based on the second frame. The second communication device sends a third frame to the first communication device, where the third frame is used to indicate a result of performing channel sounding on the part of antennas.

Optionally, the part of antennas may be a predetermined antenna that can well communicate with the second communication device, for example, may be an antenna that is in predetermined antennas of the first communication device and that can well communicate with the second communication device.

Optionally, the part of antennas may be an antenna predetermined for communicating with the second communication device.

Correspondingly, there are many manners in which the first frame indicates the foregoing part of antennas. For example, the first frame indicates, based on one or more panel identifiers, the second communication device to perform channel sounding on an antenna corresponding to the one or more panel identifiers. For another example, the first frame indicates, based on one or more AP identifiers, the second communication device to perform channel sounding on an antenna corresponding to the one or more AP identifiers. For another example, the first frame uses an index directly indicating an antenna to indicate the part of antennas. For another example, the first frame uses an index of a start antenna and an index of an end antenna to indicate the part of antennas. For another example, the first frame uses an index of a start antenna and an antenna quantity to indicate the part of antennas.

Based on the foregoing technical solution, the first communication device may indicate, to the second communication device, a part of antennas on which channel measurement needs to be performed by the second communication device, and the second communication device performs channel sounding only on a corresponding panel and feeds back a channel sounding result. This can reduce channel state information feedback overheads compared with a case of performing channel sounding on all the antennas of the first communication device and feeding back channel sounding results each time.

With reference to the second aspect, in a possible implementation, before the second communication device sends the third frame to the first communication device, the method further includes: The second communication device receives a fourth frame sent by the first communication device. The fourth frame is used to indicate the second communication device to send the third frame to the first communication device.

Based on the foregoing technical solution, the first communication device may trigger, based on the fourth frame, at least one second communication device to simultaneously feed back a third frame. This helps improve channel sounding efficiency.

With reference to the second aspect or any one of the foregoing possible implementations, in another possible implementation, before the second communication device receives the first frame from the first communication device, the method further includes: The second communication device receives a training frame from the first communication device, where the training frame is used to perform channel sounding on all the antennas of the first communication device. The second communication device sends a feedback frame to the first communication device, so that the first communication device determines the part of antennas based on the feedback frame.

Based on the foregoing technical solution, an antenna set for communication with the second communication device may be predetermined based on an actual channel condition or the like. This helps increase a success probability of subsequent communication between the first communication device and the second communication device.

With reference to the second aspect or any one of the foregoing possible implementations, in another possible implementation, before the second communication device receives a training frame from the first communication device, the method further includes: The second communication device receives a pre-training frame sent by the first communication device. The pre-training frame is used to indicate the second communication device to perform channel sounding on all the antennas of the first communication device.

Based on the foregoing technical solution, the second communication device can be indicated in advance to prepare for channel sounding, so that the second communication device prepares for channel sounding in a timely manner. This helps improve channel sounding efficiency.

With reference to the second aspect or any one of the foregoing possible implementations, in another possible implementation, before the second communication device sends the feedback frame to the first communication device, the method further includes: The second communication device receives a trigger frame from the first communication device. The trigger frame is used to indicate the second communication device to send the feedback frame to the first communication device.

With reference to the second aspect or any one of the foregoing possible implementations, in another possible implementation, the first frame includes a first field. The first field is used to indicate a part of panels of the first communication device, and the part of antennas includes an antenna corresponding to the part of panels.

Based on the foregoing technical solution, the second communication device can be indicated in advance to prepare for channel sounding, so that the second communication device prepares for channel sounding in a timely manner. This helps improve channel sounding efficiency.

With reference to the second aspect or any one of the foregoing possible implementations, in another possible implementation, the first frame includes a first field. The first field is used to carry an antenna index, and the antenna index is used to indicate the part of antennas.

Optionally, the first frame uses an index directly indicating an antenna to indicate the part of antennas.

Optionally, the first frame uses an index of a start antenna and an index of an end antenna to indicate the part of antennas.

Optionally, the first frame uses an index of a start antenna and an antenna quantity to indicate the part of antennas.

With reference to the second aspect or any one of the foregoing possible implementations, in another possible implementation, the first frame further includes a second field. The second field is used to indicate that the first field is used to indicate a part of panels of the first communication device or carry an antenna index.

That is, the first communication device may notify the second communication device that a current scenario is an MP MIMO scenario. In this way, communication between the first communication device and the second communication device can be adapted to different scenarios.

With reference to the second aspect or any one of the foregoing possible implementations, in another possible implementation, the first frame includes a third field. The third field is used to indicate that the first frame is a frame of an extremely high throughput EHT variant.

Optionally, the third field may be one or more bits in a sounding dialog token field.

For example, the third field includes a standard control field including bits of a ranging field and an HE field in the sounding dialog token field. When a value of the standard control field is 00, it indicates that the first frame is a frame of a VHT variant; when a value of the standard control field is 01, it indicates that the first frame is a frame of an HE variant; when a value of the standard control field is 10, it indicates that the first frame is a frame of an EHT variant; or when a value of the standard control field is 11, it indicates that the first frame is a frame of a ranging variant. Alternatively, when a value of the standard control field is 00, it indicates that the NDPA frame is a frame of a VHT variant; when a value of the standard control field is 01, it indicates that the NDPA frame is a frame of an HE variant; when a value of the standard control field is 10, it indicates that the NDPA frame is a frame of a ranging variant; or when a value of the standard control field is 11, it indicates that the NDPA frame is a frame of an EHT variant.

Optionally, the third field includes a standard control field including bits of a ranging field and an HE field in the sounding dialog token field, and one or more bits in a station information field. When a value of the standard control field is 00, it indicates that the first frame is a frame of a VHT variant or a frame of an EHT variant; when a value of the standard control field is 01, it indicates that the first frame is a frame of an HE variant; when a value of the standard control field is 10, it indicates that the first frame is a frame of a ranging variant; or when a value of the standard control field is 11, it indicates that the first frame is invalid or reserved for future use.

In the foregoing example, when the value of the standard control field is 00, it indicates that the first frame is the frame of the VHT variant or the frame of the EHT variant. Therefore, distinguishing may be further performed based on one or more bits in the station information field.

In an example, one bit in the station information field may be occupied, and the bit is used to further indicate whether the first frame is a frame of a VHT variant or a frame of an EHT variant.

For example, a new disambiguation field may be set in the station information field. When a value of the disambiguation field is 0, it indicates that the first frame is a frame of a VHT variant; or when a value of the disambiguation field is 1, it indicates that the first frame is a frame of an EHT variant. Alternatively, when a value of the disambiguation field is 1, it indicates that the first frame is a frame of a VHT variant; or when a value of the disambiguation field is 0, it indicates that the first frame is a frame of an EHT variant.

For another example, one bit in an association identifier field may be used to further indicate whether the first frame is a frame of a VHT variant or a frame of an EHT variant. When a value of the bit is 0, it indicates that the first frame is a frame of a VHT variant; or when a value of the bit is 1, it indicates that the first frame is a frame of an EHT variant. Alternatively, when a value of the bit is 1, it indicates that the first frame is a frame of a VHT variant; or when a value of the bit is 0, it indicates that the first frame is a frame of an EHT variant.

For another example, a value of a special association identifier may be used to further indicate whether the first frame is a frame of a VHT variant or a frame of an EHT variant. For example, when a value of the association identifier is 2044, it indicates that the first frame is a frame of a VHT variant; or when a value of the association identifier is 2043, it indicates that the first frame is a frame of an EHT variant.

With reference to the second aspect or any one of the foregoing possible implementations, in another possible implementation, the second frame includes an extremely high throughput EHT signal field, an EHT short training field, and an EHT long training field. The part of antennas corresponds to at least two antenna panels, the second frame includes at least two second subframes, and the EHT long training field in the second subframe includes a long training field of an antenna corresponding to one of the at least two antenna panels.

With reference to the second aspect or any one of the foregoing possible implementations, in another possible implementation, the second frame includes an extremely high throughput EHT signal field, an EHT short training field, and an EHT long training field. The EHT long training field includes a long training field of each of the part of antennas.

With reference to the second aspect or any one of the foregoing possible implementations, in another possible implementation, the second frame includes an extremely high throughput EHT signal field, an EHT short training field, and an EHT long training field. The part of antennas corresponds to at least two panels, the second frame includes at least two second subframes, and the EHT long training field in the second subframe includes a long training field of an antenna corresponding to one of the at least two antenna panels.

With reference to the second aspect or any one of the foregoing possible implementations, in another possible implementation, the first frame is a null data packet announcement NDPA frame, the second frame is a null data packet NDP frame, the third frame is a beamforming report frame, and the fourth frame is a trigger frame.

With reference to the second aspect or any one of the foregoing possible implementations, in another possible implementation, the first communication device is an access point AP, and the second communication device is a station STA.

According to a third aspect, this application provides a channel sounding method. The method includes: A first communication device sends a first frame to a second communication device, where the first frame is used to indicate the second communication device to perform channel sounding on a part of communication devices in a communication device group to which the first communication device belongs. The first communication device sends a second frame to the second communication device, where the second frame is used by the second communication device to perform channel sounding on the part of communication devices. The first communication device receives a third frame from the second communication device, where the third frame is used to indicate a result of performing channel sounding on the part of communication devices.

The communication device group may be a multi-communication device coordination group, which is a joint transmission set including a plurality of communication devices, for example, a multi-AP coordination group.

Optionally, the part of communication devices may be a predetermined communication device that can well communicate with the second communication device.

Optionally, the part of communication devices may be a communication device reserved for communicating with the second communication device.

Correspondingly, there are many manners in which the first frame indicates the foregoing part of antennas. For example, the first frame indicates, based on one or more panel identifiers, the second communication device to perform channel sounding on a communication device corresponding to the one or more panel identifiers. For another example, the first frame indicates, based on an identifier of one or more APs, the second communication device to perform channel sounding on the one or more APs. For another example, the first frame uses an index directly indicating an antenna to indicate the part of communication devices. For another example, the first frame uses an index of a start antenna and an index of an end antenna to indicate the part of communication devices. For another example, the first frame uses an index of a start antenna and an antenna quantity to indicate the part of communication devices.

Based on the foregoing technical solution, the first communication device may indicate, to the second communication device, a part of communication devices that is in the communication device group and on which channel measurement needs to be performed by the second communication device, and the second communication device performs channel sounding only on the corresponding communication device and feeds back a channel sounding result. This can reduce channel state information feedback overheads compared with a case of performing channel sounding on all the communication devices in the communication device group and feeding back channel sounding results each time.

With reference to the third aspect, in a possible implementation, before the first communication device receives the third frame from the second communication device, the method further includes: The first communication device sends a fourth frame to the second communication device. The fourth frame is used to indicate the second communication device to send the third frame to the first communication device.

Based on the foregoing technical solution, the first communication device may trigger, based on the fourth frame, at least one second communication device to simultaneously feed back a third frame. This helps improve channel sounding efficiency.

With reference to the third aspect or any one of the foregoing possible implementations, in another possible implementation, before the first communication device sends the first frame to the second communication device, the method further includes: The first communication device sends a training frame to the second communication device, where training frame is used to perform channel sounding on all the communication devices in the communication device group. The first communication device receives a feedback frame from the second communication device. The first communication device determines the part of communication devices based on the feedback frame.

Based on the foregoing technical solution, a communication device for communicating with the second communication device may be predetermined based on an actual channel condition or the like. This helps increase a success probability of subsequent communication between the first communication device and the second communication device.

With reference to the third aspect or any one of the foregoing possible implementations, in another possible implementation, before the first communication device sends the training frame to the second communication device, the method further includes: The first communication device sends a pre-training frame to the second communication device, where the pre-training frame is used to indicate the second communication device to perform channel sounding on all the communication devices in the communication device group.

Based on the foregoing technical solution, the second communication device can be indicated in advance to prepare for channel sounding, so that the second communication device prepares for channel sounding in a timely manner. This helps improve channel sounding efficiency.

With reference to the third aspect or any one of the foregoing possible implementations, in another possible implementation, before the first communication device receives the feedback frame from the second communication device, the method further includes: The first communication device sends a trigger frame to the second communication device. The trigger frame is used to indicate the second communication device to send the feedback frame to the first communication device.

With reference to the third aspect or any one of the foregoing possible implementations, in another possible implementation, the first frame includes a first field. The first field is used to carry a communication device bitmap, and the communication device bitmap is used to indicate the part of communication devices.

Optionally, the first field may be used to carry the communication device bitmap, and the communication device bitmap is used to indicate the part of communication devices in the communication device group. For example, when the communication device group includes a communication device 1 to a communication device 4, the communication device bitmap may use four bits to represent the four communication devices respectively. For example, 1001 indicates that antennas of the communication device 1 and the communication device 4 are antennas on which channel sounding needs to be performed this time.

Optionally, different values of the first field may be used to represent different communication device combinations. For example, when the communication device group includes a communication device 1 to a plane communication device 4, the first field includes four bits. When a value of the first field is 1111, the first field represents a communication device 1-3. When a value of the first field is 1010, the first field represents a communication device 1-2.

Optionally, the first field may alternatively indicate a communication device index directly.

With reference to the third aspect or any one of the foregoing possible implementations, in another possible implementation, the first frame includes a first field. The first field is used to carry an antenna index, and the antenna index is used to indicate the part of communication devices.

Optionally, the first frame uses an index directly indicating an antenna to indicate the part of communication devices.

Optionally, the first frame uses an index of a start antenna and an index of an end antenna to indicate the part of communication devices.

Optionally, the first frame uses an index of a start antenna and an antenna quantity to indicate the part of communication devices.

With reference to the third aspect or any one of the foregoing possible implementations, in another possible implementation, the first frame further includes a second field. The second field is used to indicate that the first field carries a communication device bitmap or an antenna index.

In other words, the first communication device may notify the second communication device that a current scenario is a multi-communication device coordination scenario. In this way, communication between the first communication device and the second communication device can be adapted to different scenarios.

With reference to the third aspect or any one of the foregoing possible implementations, in another possible implementation, the first frame includes a third field. The third field is used to indicate that the first frame is a frame of an extremely high throughput EHT variant.

For example, the third field includes a standard control field including bits of a ranging field and an HE field in the sounding dialog token field. When a value of the standard control field is 00, it indicates that the first frame is a frame of a VHT variant; when a value of the standard control field is 01, it indicates that the first frame is a frame of an HE variant; when a value of the standard control field is 10, it indicates that the first frame is a frame of an EHT variant; or when a value of the standard control field is 11, it indicates that the first frame is a frame of a ranging variant. Alternatively, when a value of the standard control field is 00, it indicates that the NDPA frame is a frame of a VHT variant; when a value of the standard control field is 01, it indicates that the NDPA frame is a frame of an HE variant; when a value of the standard control field is 10, it indicates that the NDPA frame is a frame of a ranging variant; or when a value of the standard control field is 11, it indicates that the NDPA frame is a frame of an EHT variant.

Optionally, the third field includes a standard control field including bits of a ranging field and an HE field in the sounding dialog token field, and one or more bits in a station information field. When a value of the standard control field is 00, it indicates that the first frame is a frame of a VHT variant or a frame of an EHT variant; when a value of the standard control field is 01, it indicates that the first frame is a frame of an HE variant; when a value of the standard control field is 10, it indicates that the first frame is a frame of a ranging variant; or when a value of the standard control field is 11, it indicates that the first frame is invalid or reserved for future use.

In the foregoing example, when the value of the standard control field is 00, it indicates that the first frame is the frame of the VHT variant or the frame of the EHT variant. Therefore, distinguishing may be further performed based on one or more bits in the station information field.

In an example, one bit in the station information field may be occupied, and the bit is used to further indicate whether the first frame is a frame of a VHT variant or a frame of an EHT variant.

For example, a new disambiguation field may be set in the station information field. When a value of the disambiguation field is 0, it indicates that the first frame is a frame of a VHT variant; or when a value of the disambiguation field is 1, it indicates that the first frame is a frame of an EHT variant. Alternatively, when a value of the disambiguation field is 1, it indicates that the first frame is a frame of a VHT variant; or when a value of the disambiguation field is 0, it indicates that the first frame is a frame of an EHT variant.

For another example, one bit in an association identifier field may be used to further indicate whether the first frame is a frame of a VHT variant or a frame of an EHT variant. When a value of the bit is 0, it indicates that the first frame is a frame of a VHT variant; or when a value of the bit is 1, it indicates that the first frame is a frame of an EHT variant. Alternatively, when a value of the bit is 1, it indicates that the first frame is a frame of a VHT variant; or when a value of the bit is 0, it indicates that the first frame is a frame of an EHT variant.

For another example, a value of a special association identifier may be used to further indicate whether the first frame is a frame of a VHT variant or a frame of an EHT variant. For example, when a value of the association identifier is 2044, it indicates that the first frame is a frame of a VHT variant; or when a value of the association identifier is 2043, it indicates that the first frame is a frame of an EHT variant.

With reference to the third aspect or any one of the foregoing possible implementations, in another possible implementation, the second frame includes an extremely high throughput EHT signal field, an EHT short training field, and an EHT long training field. The EHT long training field includes a long training field of each of the part of antennas.

With reference to the third aspect or any one of the foregoing possible implementations, in another possible implementation, the second frame includes an extremely high throughput EHT signal field, an EHT short training field, and an EHT long training field. The part of antennas corresponds to at least two panels, the second frame includes at least two second subframes, and the EHT long training field in the second subframe includes a long training field of an antenna corresponding to one of the at least two antenna panels.

With reference to the third aspect or any one of the foregoing possible implementations, in another possible implementation, the first frame is a null data packet announcement NDPA frame, the second frame is a null data packet NDP frame, the third frame is a beamforming report frame, and the fourth frame is a trigger frame.

With reference to the third aspect or any one of the foregoing possible implementations, in another possible implementation, the first communication device is an access point AP, and the second communication device is a station STA.

According to a fourth aspect, this application provides a channel sounding method. The method includes: A second communication device receives a first frame from a first communication device, where the first frame is used to indicate the second communication device to perform channel sounding on a part of communication devices in a communication device group to which the first communication device belongs. The second communication device receives a second frame from the first communication device, where the second frame is used by the second communication device to perform channel sounding on the part of communication device. The second communication device performs channel sounding on the part of communication devices based on the second frame. The second communication device sends a third frame to the first communication device, where the third frame is used to indicate a result of performing channel sounding on the part of communication devices.

The communication device group may be a multi-communication device coordination group, which is a joint transmission set including a plurality of communication devices, for example, a multi-AP coordination group.

Optionally, the part of communication devices may be a predetermined communication device that can well communicate with the second communication device.

Optionally, the part of communication devices may be a communication device predetermined for communicating with the second communication device.

Correspondingly, there are many manners in which the first frame indicates the foregoing part of antennas. For example, the first frame indicates, based on one or more panel identifiers, the second communication device to perform channel sounding on a communication device corresponding to the one or more panel identifiers. For another example, the first frame indicates, based on an identifier of one or more APs, the second communication device to perform channel sounding on the one or more APs. For another example, the first frame uses an index directly indicating an antenna to indicate the part of communication devices. For another example, the first frame uses an index of a start antenna and an index of an end antenna to indicate the part of communication devices. For another example, the first frame uses an index of a start antenna and an antenna quantity to indicate the part of communication devices.

Based on the foregoing technical solution, the first communication device may indicate, to the second communication device, a part of communication devices that is in the communication device group and on which channel measurement needs to be performed by the second communication device, and the second communication device performs channel sounding only on the corresponding communication device and feeds back a channel sounding result. This can reduce channel state information feedback overheads compared with a case of performing channel sounding on all the communication devices in the communication device group and feeding back channel sounding results each time.

With reference to the fourth aspect, in a possible implementation, before the second communication device sends the third frame to the first communication device, the method further includes: The second communication device receives a fourth frame sent by the first communication device. The fourth frame is used to indicate the second communication device to send the third frame to the first communication device.

Based on the foregoing technical solution, the first communication device may trigger, based on the fourth frame, at least one second communication device to simultaneously feed back a third frame. This helps improve channel sounding efficiency.

With reference to the fourth aspect or any one of the foregoing possible implementations, in another possible implementation, before the second communication device receives the first frame from the first communication device, the method further includes: The second communication device receives a training frame from the first communication device, where the training frame is used to perform channel sounding on all communication devices in the communication device group. The second communication device sends a feedback frame to the first communication device, so that the first communication device determines the part of communication devices based on the feedback frame.

Based on the foregoing technical solution, a communication device for communicating with the second communication device may be predetermined based on an actual channel condition or the like. This helps increase a success probability of subsequent communication between the first communication device and the second communication device.

With reference to the fourth aspect or any one of the foregoing possible implementations, in another possible implementation, before the second communication device receives the training frame from the first communication device, the method further includes: The second communication device receives a pre-training frame sent by the first communication device. The pre-training frame is used to indicate the second communication device to perform channel sounding on all the communication devices in the communication device group.

Based on the foregoing technical solution, the second communication device can be indicated in advance to prepare for channel sounding, so that the second communication device prepares for channel sounding in a timely manner. This helps improve channel sounding efficiency.

With reference to the fourth aspect or any one of the foregoing possible implementations, in another possible implementation, before the second communication device sends the feedback frame to the first communication device, the method further includes: The second communication device receives a trigger frame from the first communication device. The trigger frame is used to indicate the second communication device to send the feedback frame to the first communication device.

With reference to the fourth aspect or any one of the foregoing possible implementations, in another possible implementation, the first frame includes a first field. The first field is used to carry a communication device bitmap, and the communication device bitmap is used to indicate the part of communication devices.

Optionally, the first field may be used to carry the communication device bitmap, and the communication device bitmap is used to indicate the part of communication devices in the communication device group. For example, when the communication device group includes a communication device 1 to a plane communication device 4, the communication device bitmap may use four bits to represent the four communication devices respectively. For example, 1001 indicates that antennas of the communication device 1 and the communication device 4 are antennas on which channel sounding needs to be performed this time.

Optionally, different values of the first field may be used to represent different communication device combinations. For example, when the communication device group includes a communication device 1 to a plane communication device 4, the first field includes four bits. When a value of the first field is 1111, the first field represents a communication device 1-3. When a value of the first field is 1010, the first field represents a communication device 1-2.

Optionally, the first field may alternatively indicate a communication device index directly.

With reference to the fourth aspect or any one of the foregoing possible implementations, in another possible implementation, the first frame includes a first field. The first field is used to carry an antenna index, and the antenna index is used to indicate the part of communication devices.

Optionally, the first frame uses an index directly indicating an antenna to indicate the part of communication devices.

Optionally, the first frame uses an index of a start antenna and an index of an end antenna to indicate the part of communication devices.

Optionally, the first frame uses an index of a start antenna and an antenna quantity to indicate the part of communication devices.

With reference to the fourth aspect or any one of the foregoing possible implementations, in another possible implementation, the first frame further includes a second field. The second field is used to indicate that the first field carries a communication device bitmap or an antenna index.

In other words, the first communication device may notify the second communication device that a current scenario is a multi-communication device coordination scenario. In this way, communication between the first communication device and the second communication device can be adapted to different scenarios.

With reference to the fourth aspect or any one of the foregoing possible implementations, in another possible implementation, the first frame includes a third field. The third field is used to indicate that the first frame is a frame of an extremely high throughput EHT variant.

For example, the third field includes a standard control field including bits of a ranging field and an HE field in the sounding dialog token field. When a value of the standard control field is 00, it indicates that the first frame is a frame of a VHT variant; when a value of the standard control field is 01, it indicates that the first frame is a frame of an HE variant; when a value of the standard control field is 10, it indicates that the first frame is a frame of an EHT variant; or when a value of the standard control field is 11, it indicates that the first frame is a frame of a ranging variant. Alternatively, when a value of the standard control field is 00, it indicates that the NDPA frame is a frame of a VHT variant; when a value of the standard control field is 01, it indicates that the NDPA frame is a frame of an HE variant; when a value of the standard control field is 10, it indicates that the NDPA frame is a frame of a ranging variant; or when a value of the standard control field is 11, it indicates that the NDPA frame is a frame of an EHT variant.

Optionally, the third field includes a standard control field including bits of a ranging field and an HE field in the sounding dialog token field, and one or more bits in a station information field. When a value of the standard control field is 00, it indicates that the first frame is a frame of a VHT variant or a frame of an EHT variant; when a value of the standard control field is 01, it indicates that the first frame is a frame of an HE variant; when a value of the standard control field is 10, it indicates that the first frame is a frame of a ranging variant; or when a value of the standard control field is 11, it indicates that the first frame is invalid or reserved for future use.

In the foregoing example, when the value of the standard control field is 00, it indicates that the first frame is the frame of the VHT variant or the frame of the EHT variant. Therefore, distinguishing may be further performed based on one or more bits in the station information field.

In an example, one bit in the station information field may be occupied, and the bit is used to further indicate whether the first frame is a frame of a VHT variant or a frame of an EHT variant.

For example, a new disambiguation field may be set in the station information field. When a value of the disambiguation field is 0, it indicates that the first frame is a frame of a VHT variant; or when a value of the disambiguation field is 1, it indicates that the first frame is a frame of an EHT variant. Alternatively, when a value of the disambiguation field is 1, it indicates that the first frame is a frame of a VHT variant; or when a value of the disambiguation field is 0, it indicates that the first frame is a frame of an EHT variant.

For another example, one bit in an association identifier field may be used to further indicate whether the first frame is a frame of a VHT variant or a frame of an EHT variant. When a value of the bit is 0, it indicates that the first frame is a frame of a VHT variant; or when a value of the bit is 1, it indicates that the first frame is a frame of an EHT variant. Alternatively, when a value of the bit is 1, it indicates that the first frame is a frame of a VHT variant; or when a value of the bit is 0, it indicates that the first frame is a frame of an EHT variant.

For another example, a value of a special association identifier may be used to further indicate whether the first frame is a frame of a VHT variant or a frame of an EHT variant. For example, when a value of the association identifier is 2044, it indicates that the first frame is a frame of a VHT variant; or when a value of the association identifier is 2043, it indicates that the first frame is a frame of an EHT variant.

With reference to the fourth aspect or any one of the foregoing possible implementations, in another possible implementation, the second frame includes an extremely high throughput EHT signal field, an EHT short training field, and an EHT long training field. The EHT long training field includes a long training field of each of the part of antennas.

With reference to the fourth aspect or any one of the foregoing possible implementations, in another possible implementation, the second frame includes an extremely high throughput EHT signal field, an EHT short training field, and an EHT long training field. The part of antennas corresponds to at least two panels, the second frame includes at least two second subframes, and the EHT long training field in the second subframe includes a long training field of an antenna corresponding to one of the at least two antenna panels.

With reference to the fourth aspect or any one of the foregoing possible implementations, in another possible implementation, the first frame is a null data packet announcement NDPA frame, the second frame is a null data packet NDP frame, the third frame is a beamforming report frame, and the fourth frame is a trigger frame.

With reference to the fourth aspect or any one of the foregoing possible implementations, in another possible implementation, the first communication device is an access point AP, and the second communication device is a station STA.

According to a fifth aspect, this application provides a channel sounding apparatus. The apparatus is configured to perform the method provided in the first aspect. Specifically, the apparatus may include modules configured to perform the first aspect and any one of the possible implementations of the first aspect.

According to a sixth aspect, this application provides a channel sounding apparatus. The apparatus is configured to perform the method provided in the second aspect. Specifically, the apparatus may include modules configured to perform the second aspect and any one of the possible implementations of the second aspect.

According to a seventh aspect, this application provides a channel sounding apparatus. The apparatus is configured to perform the method provided in the first aspect. Specifically, the apparatus may include modules configured to perform the third aspect and any one of the possible implementations of the third aspect.

According to an eighth aspect, this application provides a channel sounding apparatus. The apparatus is configured to perform the method provided in the second aspect. Specifically, the apparatus may include modules configured to perform the fourth aspect and any one of the possible implementations of the fourth aspect.

According to a ninth aspect, this application provides a channel sounding apparatus, including a processor. The processor is coupled to a memory, and may be configured to execute instructions in the memory, to implement the method according to the first aspect and any one of the possible implementations of the first aspect. Optionally, the apparatus further includes a memory. Optionally, the apparatus further includes a communication interface, and the processor is coupled to the communication interface.

In an implementation, the apparatus is an access point. When the apparatus is an access point, the communication interface may be a transceiver or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a tenth aspect, this application provides a channel sounding apparatus, including a processor. The processor is coupled to a memory, and may be configured to execute instructions in the memory, to implement the method according to the second aspect and any one of the possible implementations of the second aspect. Optionally, the apparatus further includes a memory. Optionally, the apparatus further includes a communication interface, and the processor is coupled to the communication interface.

In an implementation, the apparatus is an access point. When the apparatus is an access point, the communication interface may be a transceiver or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to an eleventh aspect, this application provides a channel sounding apparatus, including a processor. The processor is coupled to a memory, and may be configured to execute instructions in the memory, to implement the method according to the third aspect and any one of the possible implementations of the third aspect. Optionally, the apparatus further includes a memory. Optionally, the apparatus further includes a communication interface, and the processor is coupled to the communication interface.

In an implementation, the apparatus is an access point. When the apparatus is an access point, the communication interface may be a transceiver or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a twelfth aspect, this application provides a channel sounding apparatus, including a processor. The processor is coupled to a memory, and may be configured to execute instructions in the memory, to implement the method according to the fourth aspect or any one of the possible implementations of the fourth aspect. Optionally, the apparatus further includes a memory. Optionally, the apparatus further includes a communication interface, and the processor is coupled to the communication interface.

In an implementation, the apparatus is an access point. When the apparatus is an access point, the communication interface may be a transceiver or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a thirteenth aspect, this application provides a computer-readable storage medium. The computer-readable storage medium stores a computer program. When the computer program is executed by an apparatus, the apparatus is enabled to implement the method according to the first aspect and any one of the possible implementations of the first aspect.

According to a fourteenth aspect, this application provides a computer-readable storage medium. The computer-readable storage medium stores a computer program. When the computer program is executed by an apparatus, the apparatus is enabled to implement the method according to the second aspect and any one of the possible implementations of the second aspect.

According to a fifteenth aspect, this application provides a computer-readable storage medium. The computer-readable storage medium stores a computer program. When the computer program is executed by an apparatus, the apparatus is enabled to implement the method according to the third aspect and any one of the possible implementations of the third aspect.

According to a sixteenth aspect, this application provides a computer-readable storage medium. The computer-readable storage medium stores a computer program. When the computer program is executed by an apparatus, the apparatus is enabled to implement the method according to the fourth aspect and any one of the possible implementations of the fourth aspect.

According to a seventeenth aspect, this application provides a computer program product including instructions. When the instructions are executed by a computer, an apparatus is enabled to implement the method according to the first aspect and any one of the possible implementations of the first aspect.

According to an eighteenth aspect, this application provides a computer program product including instructions. When the instructions are executed by a computer, an apparatus is enabled to implement the method according to the second aspect and any one of the possible implementations of the second aspect.

According to a nineteenth aspect, this application provides a computer program product including instructions. When the instructions are executed by a computer, an apparatus is enabled to implement the method according to the third aspect and any one of the possible implementations of the third aspect.

According to a twentieth aspect, this application provides a computer program product including instructions. When the instructions are executed by a computer, an apparatus is enabled to implement the method according to the fourth aspect and any one of the possible implementations of the fourth aspect.

According to a twenty-first aspect, this application provides a chip. The chip includes a processor and a communication interface, the processor and the interface circuit are coupled to each other, the communication interface is configured to communicate with another device, and the processor is configured to implement the method according to the first aspect or any one of the implementations of the first aspect, the method according to the second aspect or any one of the implementations of the second aspect, the method according to the third aspect or any one of the implementations of the third aspect, or the method according to the fourth aspect or any one of implementations of the fourth aspect.

In a possible implementation, the chip further includes a memory, configured to store instructions executed by the processor, store input data required by the processor to run instructions, or store data generated after the processor runs instructions.

According to a twenty-second aspect, this application provides a communication system, including the foregoing access point and station.

BRIEF DESCRIPTION OF DRAWINGS

FIG. 8 shows a frame structure of an NDP frame;

FIG. 9 shows a frame structure of a trigger frame;

FIG. 10 shows a frame structure of a beamforming report frame;

FIG. 17 is a schematic diagram of still another implementation of an NDP frame according to an embodiment of this application;

FIG. 18 is a schematic diagram of a panel pre-training procedure according to an embodiment of this application;

FIG. 19 is a schematic diagram of an implementation of a training frame according to an embodiment of this application;

FIG. 20 shows a frame structure of a panel training trigger frame according to an embodiment of this application;

FIG. 21 shows a frame structure of a feedback frame according to an embodiment of this application;

FIG. 22 is a schematic diagram of an OFDMA-based panel pre-training procedure according to an embodiment of this application;

FIG. 23 is a schematic diagram of an MU MIMO-based panel pre-training procedure according to an embodiment of this application;

DESCRIPTION OF EMBODIMENTS

Figures 1, 2:
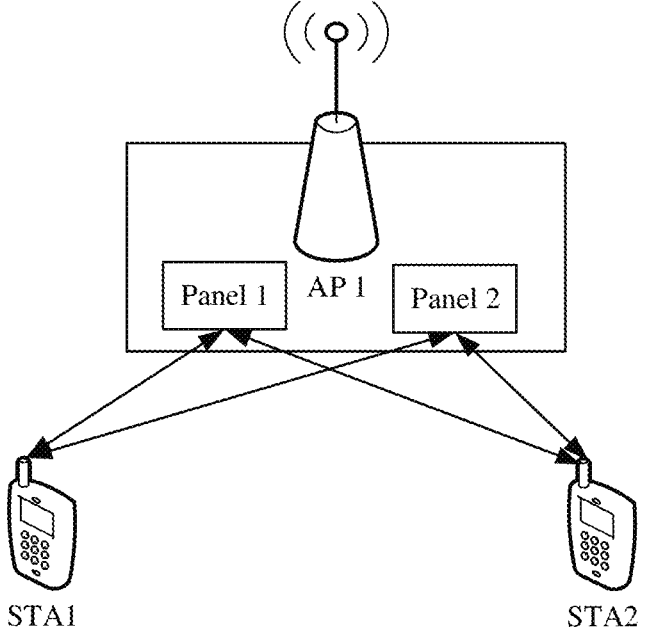
FIG. 1 is a schematic diagram of an architecture of a wireless communication system applicable to an embodiment of this application.
FIG. 2 is a diagram of an internal structure of an AP according to an embodiment of this application.

The following describes the technical solutions of this application with reference to the accompanying drawings.

The technical solutions of embodiments of this application may be applied to various communication systems, such as a wireless local area network (wireless local area network, WLAN) communication system, a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, LTE time division duplex (time division duplex, TDD), a universal mobile telecommunications system (universal mobile telecommunication system, UMTS), a worldwide interoperability for microwave access (worldwide interoperability for microwave access, WiMAX) communication system, and a 5th generation (5th generation, 5G) system or new radio (new radio, NR).

The following is used as an example for description. Only a WLAN system is used as an example below to describe an application scenario in embodiments of this application and a method in embodiments of this application.

Specifically, embodiments of this application may be applied to a wireless local area network (wireless local area network, WLAN), and embodiments of this application may be applied to any protocol in the IEEE 802.11 series protocols currently used in a WLAN. The WLAN may include one or more basic service sets (basic service set, BSS), and network nodes in the basic service set include an AP and a STA.

Specifically, in embodiments of this application, an initiating device and a responding device may be user stations (STA) in the WLAN. The user station may also be referred to as a system, a subscriber unit, an access terminal, a mobile station, a mobile, a remote station, a remote terminal, a mobile device, a user terminal, a terminal, a wireless communication device, a user agent, a user apparatus, or user equipment (user equipment, UE). The STA may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless local area network (for example, Wi-Fi) communication function, a wearable device, a computing device, or another processing device connected to a wireless modem.

In addition, the initiating device and the responding device in embodiments of this application may alternatively be APs in the WLAN. The AP may be configured to: communicate with an access terminal through a wireless local area network, and transmit data of the access terminal to a network side, or transmit data from the network side to the access terminal.

For ease of understanding of embodiments of this application, the communication system shown in FIG. 1 is first used as an example to describe in detail a communication system to which embodiments of this application are applicable. The communication system shown in FIG. 1 may be a WLAN system. The WLAN system in FIG. 1 may include one or more APs and one or more STAs. In FIG. 1, one AP (for example, an AP 1 in FIG. 1) and two STAs (for example, a STA 1 and a STA 2 in FIG. 1) are used as an example. Antennas of the AP are mounted on a plurality of panels (for example, a panel 1 and a panel 2). Each panel includes a part of antennas. The plurality of panels may be connected to each other in a wired mode, or may perform data transmission in a wireless mode. Each STA may be served by only one panel and an antenna resource of the panel, or may be served by a plurality of panels and antenna resources of the panels together.

Wireless communication may be performed between the AP and the STA according to various standards. For example, wireless communication between the AP and the STA may be performed by using a single-user multiple-input multiple-output (single-user multiple-input multiple-output, SU-MIMO) technology or a multi-user multiple-input multiple-output (multi-users multiple-input multiple-output, MU-MIMO) technology.

The AP is also referred to as a wireless access point, a hotspot, or the like. The AP is an access point for a mobile user to access a wired network, and is mainly deployed in a home, a building, and a campus, or is deployed outdoors. The AP is equivalent to a bridge connecting the wired network and a wireless network. A main function of the AP is to connect wireless network clients together, and then connect the wireless network to the Ethernet. Specifically, the AP may be a communication server, a router, a switch, a bridge, a computer, a mobile phone, or the like with a wireless fidelity (wireless fidelity, Wi-Fi) chip. Optionally, the AP may be a device supporting a plurality of WLAN standards such as 802.11. FIG. 2 is a diagram of an internal structure of an AP product. In FIG. 2, the AP includes a physical layer (physical layer, PHY) processing circuit, a media access control (media access control, MAC) processing circuit, a memory, a controller, a scheduler, and a processor. The physical layer processing circuit may be configured to process a physical layer signal. The MAC layer processing circuit may be configured to process a MAC layer signal. The memory may be configured to store signaling information, a pre-agreed preset value, and the like. The controller is a component for controlling. The scheduler is a component for scheduling. The processor may be configured to parse the signaling information, processes related data, and the like.

Figure 3:
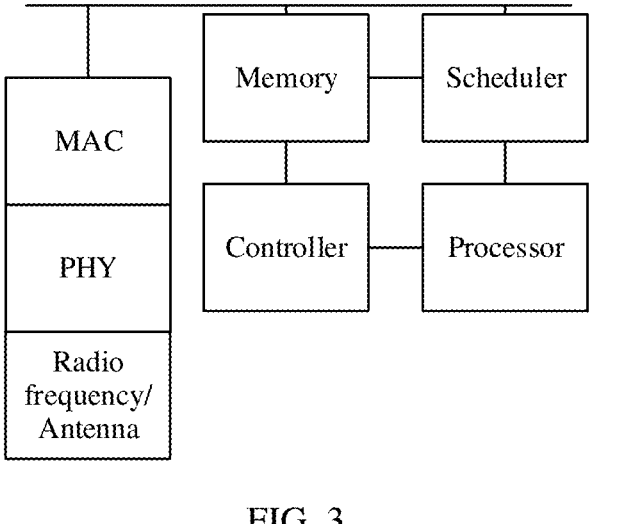
FIG. 3 is a diagram of an internal structure of a STA according to an embodiment of this application.

A STA product is usually a terminal product, for example, a mobile phone or a notebook computer, that supports the 802.11 series standards. FIG. 3 is a diagram of a structure of a STA with a single antenna. In an actual scenario, the STA may alternatively have a plurality of antennas, and may be a device with more than two antennas. In FIG. 3, the STA may include a physical layer processing circuit and a media access control processing circuit. The physical layer processing circuit may be configured to process a physical layer signal. The MAC layer processing circuit may be configured to process a MAC layer signal. The memory may be configured to store signaling information, a pre-agreed preset value, and the like. The controller is a component for controlling. The scheduler is a component for scheduling. The processor may be configured to parse the signaling information, process related data, and the like.

It should be noted that this embodiment of this application is also applicable to a scenario in which there are a plurality of APs and a plurality of STAs, a plurality of APs and a plurality of APs, or a plurality of STAs and a plurality of STAs.

The Institute of Electrical and Electronics Engineers ((institute of electrical and electronic engineers, IEEE) 802.11) standard discusses a next-generation extremely high throughput (extremely high throughput, EHT) working group for IEEE 802.11ax, and considers introducing larger bandwidth (for example, 320 MHz) and more streams (for example, 16 spatial streams) in a next-generation wireless local area network (wireless local area network, WLAN). For the EHT, a throughput is to be improved by increasing spatial streams. However, due to a limitation of a capability of a wireless device, a single access point (access point, AP) can hardly provide 16 spatial streams.

To resolve the foregoing problems, a multi-panel multi-input multi-output (multi-panel multiple input multiple output, MP MIMO) technology emerges. MP MIMO means that a wireless device (for example, a base station in a cellular network, an AP in a WLAN, or a terminal device) is formed by interconnecting a plurality of panels. A series of transceiver antennas are mounted on each panel. That is, antenna resources of one wireless device are scattered on a plurality of panels that are close to or far away from each other. MP MIMO can reduce deployment costs and complexity of numerous antennas and improve scalability, a network coverage capability, and a MIMO channel gain. MP MIMO provides a feasible solution to use of more streams or antenna resources for a next-generation WLAN.

However, regardless of whether the antenna resources are centralized or located on a plurality of panels, a technical premise for using the MIMO technology in the WLAN is a channel sounding process. That is, the AP can serve one or more stations (station, STA) in a MIMO manner through a plurality of antennas only after a non-AP station (non-AP station, non-AP STA) completes channel sounding with the AP and feeds back a channel sounding result.

Figure 4:
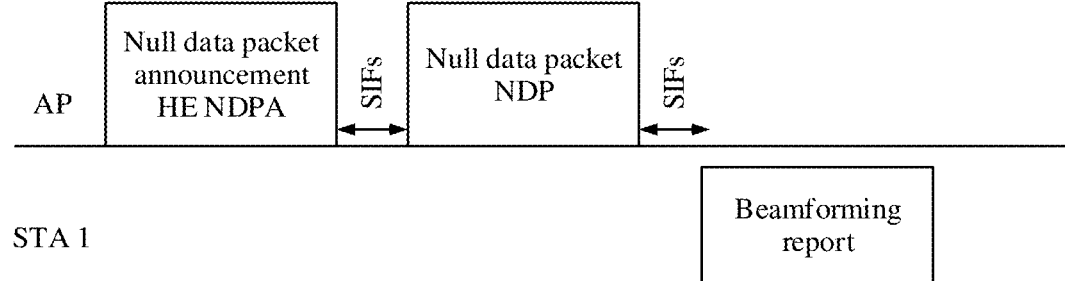
FIG. 4 is a schematic diagram of single-user channel state information feedback in IEEE 802.11 ax.

FIG. 4 is a schematic diagram of single-user channel state information feedback in IEEE 802.11ax. A channel state information feedback procedure shown in FIG. 4 is a non-trigger based (non-trigger based, Non-TB) channel sounding procedure, and is usually used in a procedure of channel sounding between an AP and a single STA. For example, the AP is a channel sounding initiator. The AP first sends a null data packet announcement (null data Packet announcement, NDPA) frame to notify which STAs need to perform channel sounding, and notifies parameters related to channel sounding to the STAs that need to perform channel sounding. Then, after a short inter-frame space (short inter-frame space, SIFS), the AP sends a null data packet (null data packet, NDP) frame, where the NDP frame has no data field part and carries no MAC frame. The STA performs channel estimation by using an NDP, and then feeds back, based on a beamforming report (beamforming report, BF Report) frame, a channel estimation result, for example, channel state information (channel state information, CSI) or channel quality information (channel quality information, CQI).

Figure 5:
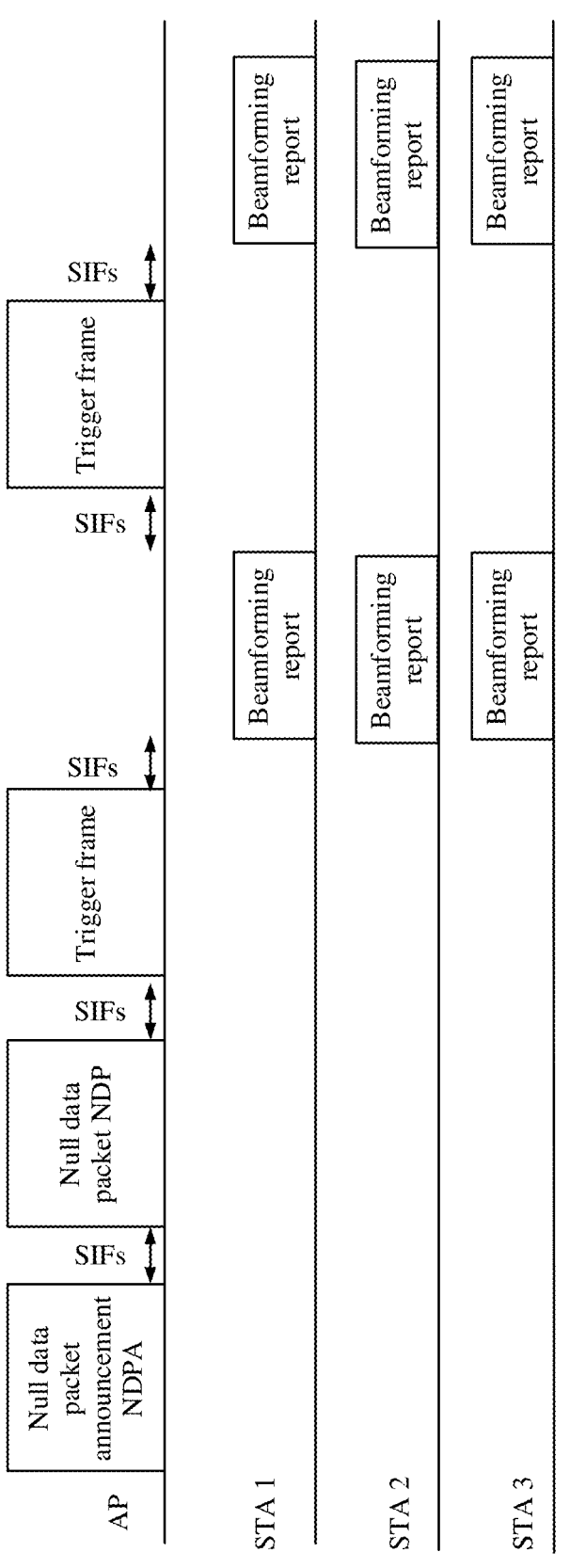
FIG. 5 is a schematic diagram of multi-user channel state information feedback in IEEE 802.11 ax.

FIG. 5 is a schematic diagram of multi-user channel state information feedback in IEEE 802.11ax. Based on FIG. 4, a trigger based (trigger based) multi-user channel state information feedback mechanism is introduced in the channel state information feedback procedure shown in FIG. 5. Specifically, the AP sends a trigger frame (trigger frame, TF) an SIFS after an NDP frame is sent, to trigger a plurality of STAs (for example, a STA 1, a STA 2, and a STA 3) to simultaneously feed back a beamforming report. In this way, channel sounding efficiency can be further improved.

Figure 6:
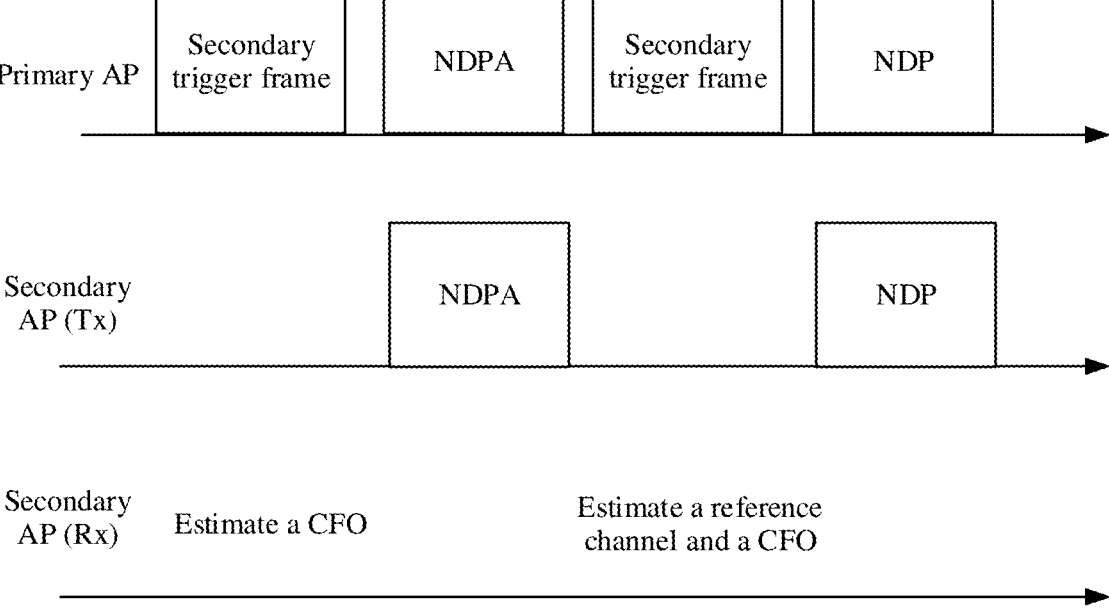
FIG. 6 is a schematic diagram of user channel state information feedback applicable to D-MIMO.

FIG. 6 is a schematic diagram of channel state information feedback applicable to distributed multiple-input multiple-output (distribute multiple input multiple output, D-MIMO). It is assumed that there is one primary AP (primary AP) and one or more secondary APs (secondary AP) among a plurality of APs participating in D-MIMO transmission. The primary AP first sends a secondary trigger (slave trigger) frame to the secondary AP. After receiving the secondary trigger frame, the secondary AP estimates a carrier frequency offset (carrier frequency offset, CFO) and the like. Then, the primary AP and the secondary AP simultaneously send an NDPA to a STA, to indicate the STA to prepare for channel sounding. Then, the primary AP sends a secondary trigger frame to the secondary AP again. After receiving the secondary trigger frame, the secondary AP estimates a CFO and the like again and estimates a reference channel, so that the secondary AP performs pre-correction before the secondary AP sends an NDP, to synchronize with the primary AP. Finally, the primary AP and the secondary AP send an NDP packet to the STA simultaneously. The STA is not shown in FIG. 6. After receiving the NDPAs, the STA learns that the STA is to participate in channel sounding. After receiving the NDPs, the STA performs channel estimation. Similar to the procedures in FIG. 4 and FIG. 5, in a subsequent procedure, the STA feeds back a beamforming report to each of the primary AP and the secondary AP.

The NDPA frame, the NDP frame, the trigger frame, and the beamforming report frame in FIG. 4 to FIG. 6 may be shown in FIG. 7, FIG. 8, FIG. 9, and FIG. 10, respectively.

Figure 7:
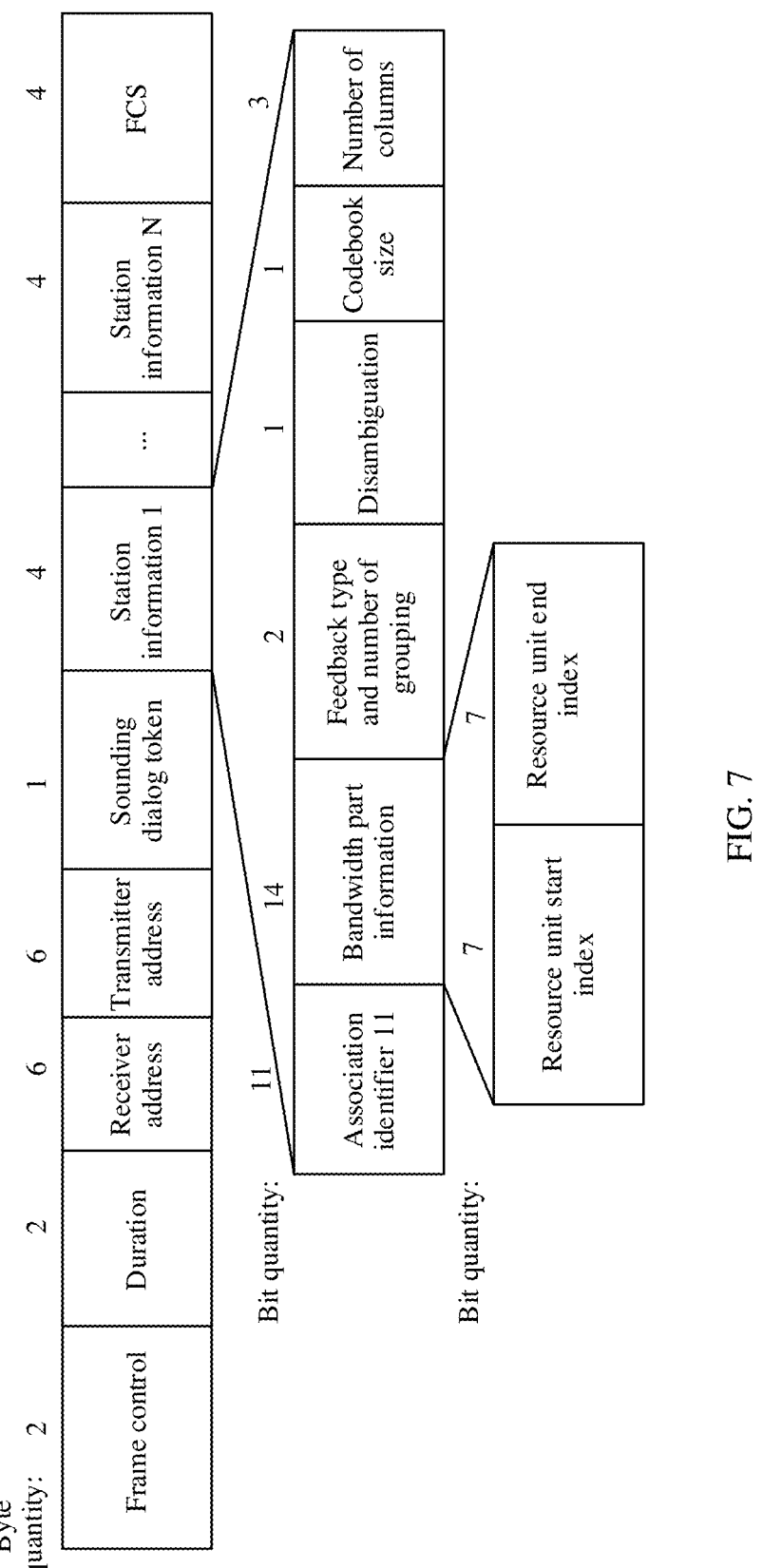
FIG. 7 shows a frame structure of an NDPA frame.

FIG. 7 shows a frame structure of an NDPA frame. The frame structure shown in FIG. 7 is a frame structure of an NDPA frame in IEEE 802.11ax. The NDPA frame in IEEE 802.11ax is also referred to as a high efficiency (high efficient, HE) NDPA frame. The NDPA frame inherits a type and a subtype of a very high throughput (very high throughput, VHT) NDPA frame, and uses a reserved bit in a sounding dialog token (sounding dialog token) field to distinguish between the VHT NDPA and the HE NDPA. Compared with that in the VHT NDPA, a station information field in the HE NDPA frame is extended to four bytes, and partial bandwidth information (Partial BW Info) is introduced to indicate a resource used by the STA to feed back channel state information. A resource unit (resource unit, RU) start index (start index) to an RU end index (end index) may indicate a segment of contiguous RUs. In addition, a number of grouping (number of grouping, Ng) is used to indicate that Ng subcarriers are grouped into one group. All of the group of subcarriers only need to feed back channel state information, to reduce feedback compression. A codebook size (codebook size) is used to indicate quantization precision. Different precision corresponds to different overheads.

FIG. 8 shows a frame structure of an NDP frame. As shown in FIG. 8, the NDP frame includes a non-high-throughput short training field (non-high-throughput short training field, L-STF), a non-high-throughput long training field (non-high-throughput long training field, L-LTF), a non-high-throughput signal field (non-high-throughput signal field, L-SIG), an extremely high throughput short training field (extremely high throughput short training field, EHT-STF), an extremely high throughput long training field (extremely high throughput long training field, EHT-LTF), an extremely high throughput signal field (extremely high throughput signal field, EHT-SIG), and a packet extension field.

Figure 9:
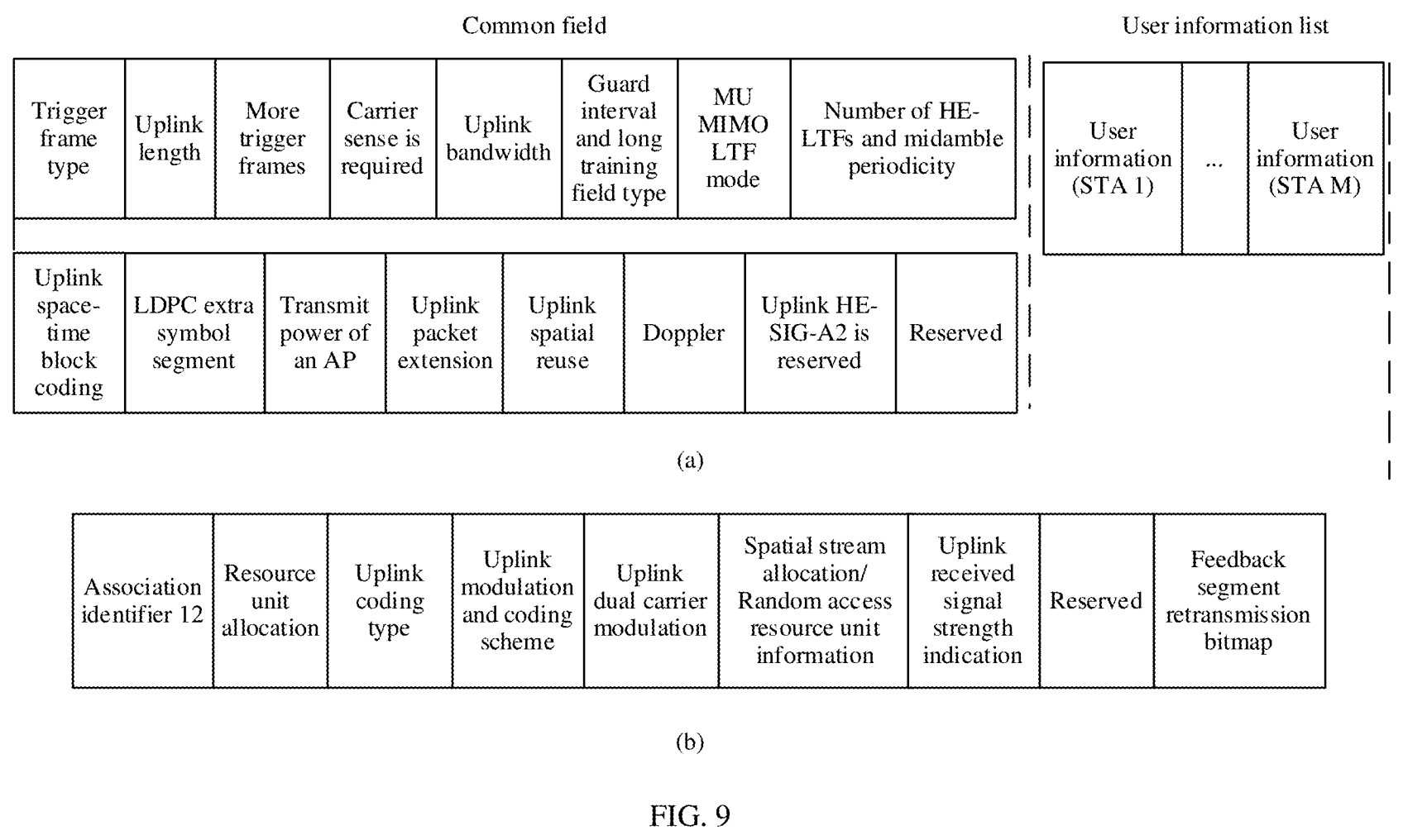

FIG. 9 shows a frame structure of a trigger frame. The frame structure shown in FIG. 9 is a trigger frame of a beamforming report poll (beamforming report poll, BFRP) variant. The trigger frame is one of a plurality of trigger frame variants, and is used to trigger a plurality of STAs to simultaneously feed back a beamforming report. As shown in (a) in FIG. 9, a frame format of the trigger frame includes a common field and a user information list, and (b) in FIG. 9 shows content included in one piece of user information in the user information list.

FIG. 10 shows a frame structure of a beamforming report frame. A frame carrying channel state information in IEEE 802.11ax is referred to as a high efficiency compressed beamforming and channel state information report (HE compressed beamforming and CQI report) frame, which includes an HE MIMO control field and a beamforming report field. FIG. 10 shows an HE MIMO control field. In some embodiments, in addition to feeding back CSI, the high efficiency compressed beamforming and channel state information report frame in IEEE 802.11ax may further feed back CQI including only a signal-to-noise ratio. It should be noted that, in this application, the CSI and the CQI are not specifically distinguished below, and are collectively referred to as CSI.

It can be learned from the foregoing content that more channel state feedback information is required if larger bandwidth and more spatial streams are introduced. This causes higher feedback overheads.

Therefore, how to reduce channel state information feedback overheads becomes an urgent problem to be resolved.

To resolve the foregoing problem, this application provides a channel sounding method and apparatus, to reduce channel state information feedback overheads.

The following describes in detail the technical solutions provided in this application with reference to the accompanying drawings. Embodiments of this application may be applied to a plurality of different scenarios, for example, a scenario (namely, an MP-MIMO scenario) shown in FIG. 1, a multi-communication device coordination scenario, a scenario in which a plurality of APs communicate with a plurality of STAs, a scenario in which a plurality of APs communicate with a plurality of APs, and a scenario in which a plurality of STAs communicate with a plurality of STAs. Two parties that perform communication may differ in different scenarios. For example, in the scenario shown in FIG. 1, the two parties that perform communication are an AP and a STA. For another example, in a scenario in which a plurality of APs communicate with a plurality of APs, the two parties that perform communication are both APs. For another example, in a scenario in which a plurality of STAs communicate with a plurality of STAs, the two parties that perform communication are both STAs. For ease of description, in embodiments of this application, two parties that perform communication are referred to as a first communication device and a second communication device. The first communication device may correspond to the foregoing initiating device or responding device, and the second communication device may correspond to the foregoing responding device or initiating device.

Figure 11:
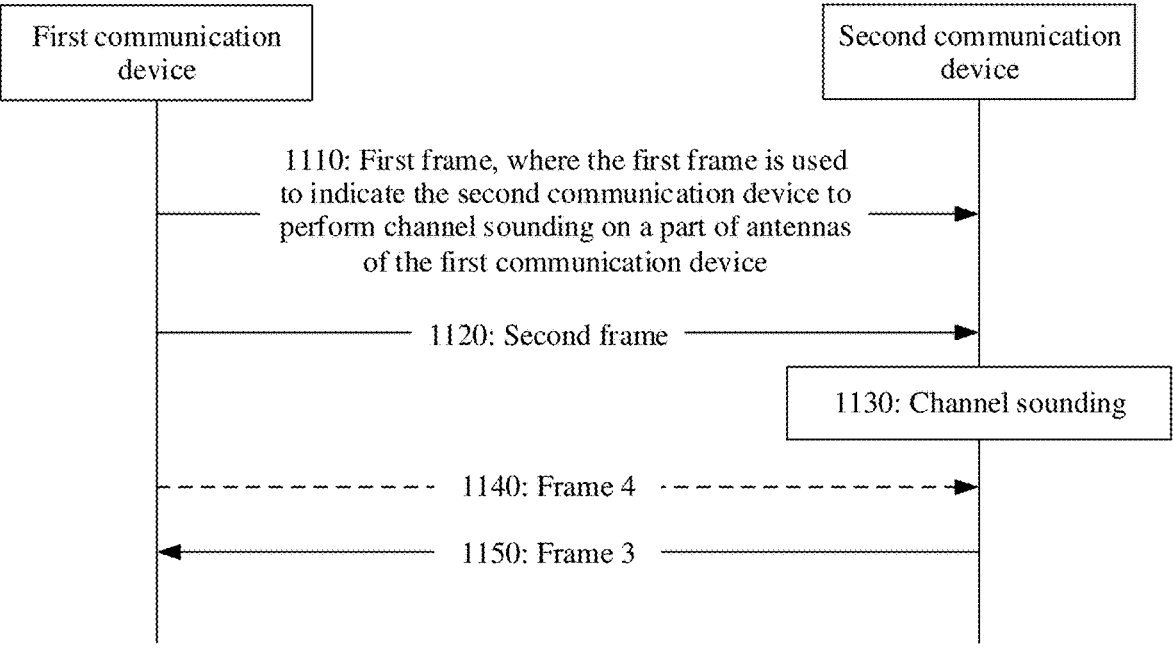
FIG. 11 is a schematic flowchart of a channel sounding method according to an embodiment of this application.

In an MP-MIMO scenario, FIG. 11 is a schematic flowchart of a channel sounding method according to an embodiment of this application. The method shown in FIG. 11 may include the following steps.

In 1110, a first communication device sends a first frame to a second communication device, and the second communication device receives the first frame from the first communication device accordingly. The first frame is used to indicate the second communication device to perform channel sounding on a part of antennas of the first communication device.

Optionally, the part of antennas may be a predetermined antenna that can well communicate with the second communication device, for example, may be an antenna that is in predetermined antennas of the first communication device and that can well communicate with the second communication device.

Optionally, the part of antennas may be an antenna, in antennas of the first communication device, predetermined for communication with the second communication device.

Optionally, the first frame may be an improved NDPA frame. The improved NDPA frame is described in detail below.

Optionally, the first frame may be a newly introduced control frame used to indicate an antenna set on which the second communication device needs to perform channel sounding.

In 1120, the first communication device sends a second frame to the second communication device, and the second communication device receives the second frame from the first communication device accordingly. The second frame is used by the second communication device to perform channel sounding on the part of antennas.

Optionally, the first communication device may send the second frame to the second communication device a first preset time period after the first frame is sent. The first preset time period may be any time length, for example, may be one or more SIFSs.

Optionally, the second frame may be an improved NDP frame. The improved NDP frame is described in detail below.

In step 1130, the second communication device performs, based on the received second frame, channel sounding on the part of antennas indicated in the first frame. Channel sounding may also be referred to as channel estimation, and both are collectively referred to as channel sounding in embodiments of this application.

Optionally, 1140 may be further performed after 1130. For example, when the first communication device indicates a plurality of second communication devices to perform channel sounding, 1140 may be further performed after 1130. In 1140, the first communication device sends a fourth frame to the second communication device, and the second communication device receives the fourth frame from the first communication device accordingly. The fourth frame is used to indicate the second communication device to feed back a channel sounding result.

Optionally, the first communication device may send the fourth frame to the second communication device a second preset time period after the second frame is sent. The second preset time period may be any time length, for example, may be one or more SIFSs.

Optionally, the fourth frame may be the trigger frame shown in FIG. 9.

Optionally, the fourth frame may be an improved trigger frame. In addition to functions of the trigger frame shown in FIG. 9, the improved trigger frame may further indicate the second communication device to report a channel sounding result corresponding to an antenna of the second communication device.

In 1150, the second communication device sends a third frame to the first communication device, and the first communication device receives the third frame from the second communication device accordingly. The third frame is used to indicate a channel sounding result of the part of antennas.

Optionally, after receiving the second frame, the second communication device sends the third frame to the first communication device after a third preset time period. The third preset time period may be any time length, for example, may be one or more SIFSs.

Optionally, after receiving the fourth frame, the second communication device sends the third frame to the first communication device.

The foregoing method is also applicable to a multi-communication device coordination scenario, a first frame is used to indicate the second communication device to perform channel sounding on a part of communication devices in a communication device group to which the first communication device belongs, a second frame is used by the second communication device to perform channel sounding on the part of communication devices, and a third frame is used to indicate a result of performing channel sounding on the part of communication devices.

The following describes the method shown in FIG. 11 with reference to specific examples.

Example 1

Figure 12:
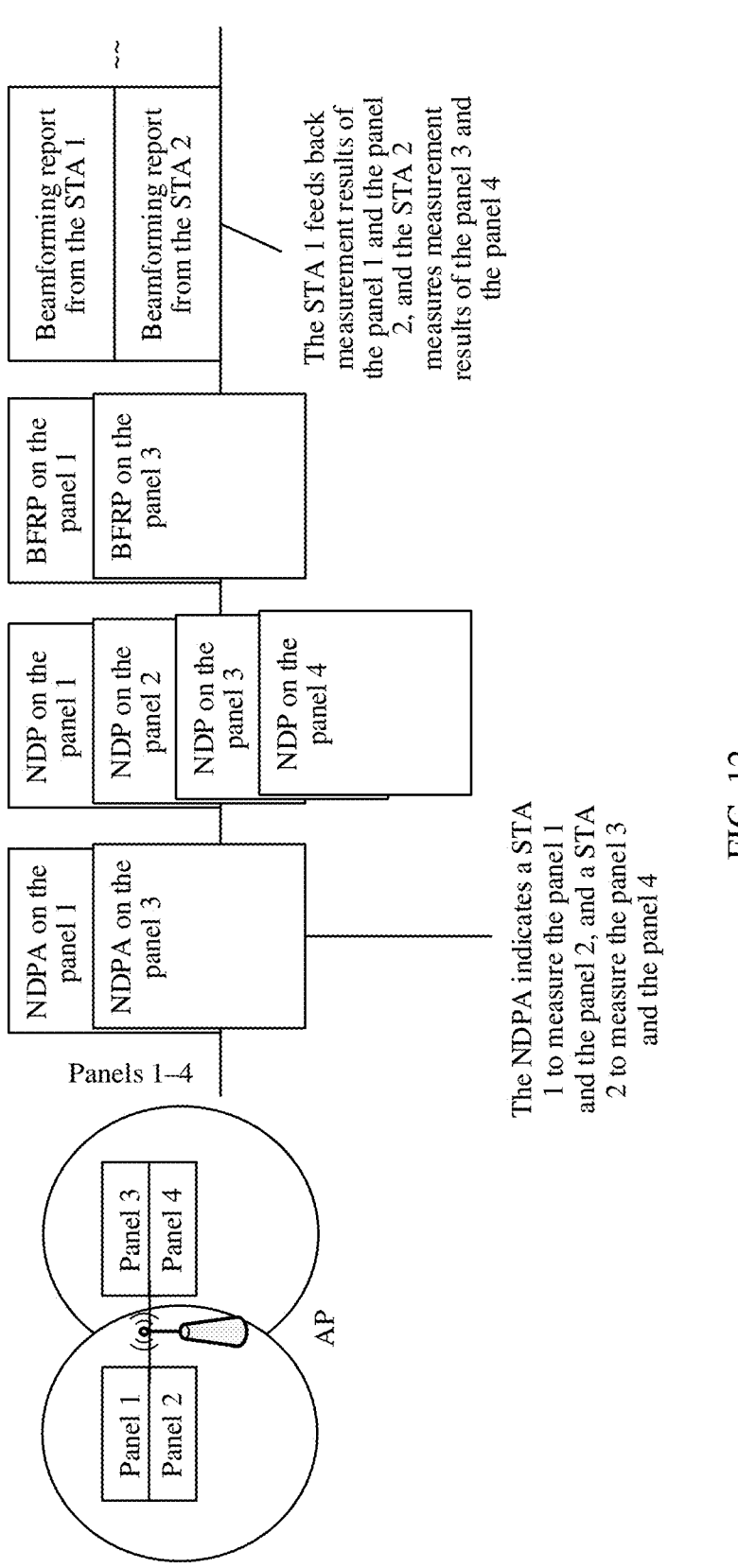
FIG. 12 shows an example of applying a channel sounding method according to an embodiment of this application.

In an MP MIMO scenario, FIG. 12 shows an example of applying a channel sounding method according to an embodiment of this application. In FIG. 12, an AP may correspond to the foregoing first communication device, a STA 1 and a STA 2 may correspond to the foregoing second communication device, an improved NDPA corresponds to the foregoing first frame, an improved NDP frame corresponds to the foregoing second frame, a BFRP frame corresponds to the foregoing fourth frame, and a beamforming report corresponds to the foregoing third frame.

The AP may send the improved NDPA frame, the improved NDP frame, and the BFRP frame on all or a part of panels.

Specifically, the AP first sends the improved NDPA frame on a panel 1 and a panel 3 jointly. The improved NDPA frame indicates the STA 1 to measure the panel 1 and a panel 2, and indicates the STA 2 to measure the panel 3 and a panel 4. Then, after an SIFS, all the panels of the AP send the improved NDP frame jointly. In addition, after receiving the improved NDPA frame, the STA 1 senses the improved NDP frame, and performs channel sounding only on the panel 1 and the panel 2. After receiving the improved NDPA frame, the STA 2 senses the improved NDP frame, and performs channel sounding only on the panel 3 and the panel 4. Then, after an SIFS, the AP sends the BFRP frame on the panel 1 and the panel 3 jointly, to trigger the STA 1 and the STA 2 to report a beamforming report. Finally, after an SIFS, the STA 1 and the STA 2 respectively feed back beamforming reports on resources allocated to the STA 1 and the STA 2. A beamforming report of the STA 1 is used to feed back channel sounding results of the panel 1 and the panel 2. A beamforming report of the STA 2 is used to feed back channel sounding results of the panel 3 and the panel 4.

Example 2

In a multi-communication device coordination scenario, a multi-communication device coordination group is a joint transmission set including a plurality of communication devices, and may send the improved NDPA frame, the improved NDP frame, and the BFRP frame by using all or a part of the plurality of communication devices. A communication device that sends the improved NDPA frame may correspond to the foregoing first communication device, a communication device that receives the improved NDPA frame may correspond to the foregoing second communication device, the improved NDPA corresponds to the foregoing first frame, the improved NDP frame corresponds to the foregoing second frame, the BFRP frame corresponds to the foregoing fourth frame, and the beamforming report corresponds to the foregoing third frame.

For example, the first communication device is an AP, and the second communication device is a STA. Specifically, first, a part or all of APs in a multi-AP coordination group send the foregoing improved NDPA frame. The improved NDPA frame indicates an AP subset that needs to be measured by each non-AP STA. The AP subset may include a primary AP and a secondary AP. AP subsets corresponding to all non-AP STAs may be the same or different. In this case, the antenna set includes antennas included in the AP subset. Then, after the improved NDPA frame is sent and after an SIFS, all the APs in the multi-AP coordination group jointly send the improved NDP frame. Then, if any non-AP STA receives the NDPA frame, determines that the STA is requested to perform a channel sounding procedure this time, and immediately receives the improved NDP frame, the non-AP STA measures a channel of a corresponding AP subset. Then, after the improved NDP frame is sent and after an SIFS, a part or all of the APs in the multi-AP coordination group send a BFRP trigger frame. Finally, after receiving the BFRP trigger frame, the non-AP STA reports only a beamforming report of a corresponding AP subset on a resource allocated to the non-AP STA.

Based on the foregoing technical solutions, the first communication device may indicate the second communication device to perform channel sounding on a part of antennas of the first communication device, or to perform channel sounding on a part of communication devices in a communication device group to which the first communication device belongs. When the first communication device learns in advance which antennas of the first communication device are used to communicate with the second communication device, or the first communication device learns in advance which antennas of communication devices in the coordination group to which the first communication device belongs are used to communicate with the second communication device, the first communication device may indicate the second communication device to perform channel sounding only on a corresponding antenna or communication device, and feed back a channel sounding result. This can reduce channel state information feedback overheads.

The following describes the improved NDPA frame and the improved NDP frame in this embodiment of this application.

The improved NDPA frame in this embodiment of this application may be in many forms, provided that functions of the first frame can be implemented.

In an MP MIMO scenario, in some embodiments, the improved NDPA frame includes a first field. The first field is used to indicate an antenna that is of the first communication device and on which channel sounding needs to be performed by the second communication device. In an example, the first field is used to carry a panel bitmap, and the panel bitmap is used to indicate a part of panels of the first communication device. In this way, the antenna on which channel sounding needs to be performed by the second communication device includes an antenna corresponding to the part of panels. In another example, the first field is used to carry an antenna index, and the antenna index indicates an antenna on which channel sounding needs to be performed by the second communication device. For example, the antenna index includes an antenna quantity and an index of a start antenna. For another example, the antenna index includes an index of a start antenna and an index of an end antenna. For another example, the antenna index includes an index of each antenna on which channel sounding needs to be performed by the second communication device.

Optionally, the improved NDPA frame further includes a second field. The second field is used to indicate that the first field carries the foregoing panel bitmap or the foregoing antenna index.

Optionally, the improved NDPA frame includes a third field. The third field is used to indicate that the first frame is a frame of an EHT variant.

In a multi-communication device coordination scenario, in some embodiments, the improved NDPA frame includes a first field. The first field is used to indicate a communication device that is in the communication device group and on which channel sounding needs to be performed by the second communication device. In an example, the first field is used to carry a communication device bitmap. In another example, the first field is used to carry an antenna index. The antenna index may correspond to a corresponding communication device. In this way, the antenna index may be used to indicate a communication device that is in the communication device group and on which channel sounding needs to be performed by the second communication device. For example, the antenna index includes an antenna quantity and an index of a start antenna. For another example, the antenna index includes an index of a start antenna and an index of an end antenna. For another example, the antenna index includes an index of each antenna on which channel sounding needs to be performed by the second communication device.

Optionally, the improved NDPA frame further includes a second field. The second field is used to indicate that the first field carries the foregoing communication device bitmap or the foregoing antenna index.

Optionally, the improved NDPA frame includes a third field. The third field is used to indicate that the first frame is a frame of an EHT variant.

Figure 13:
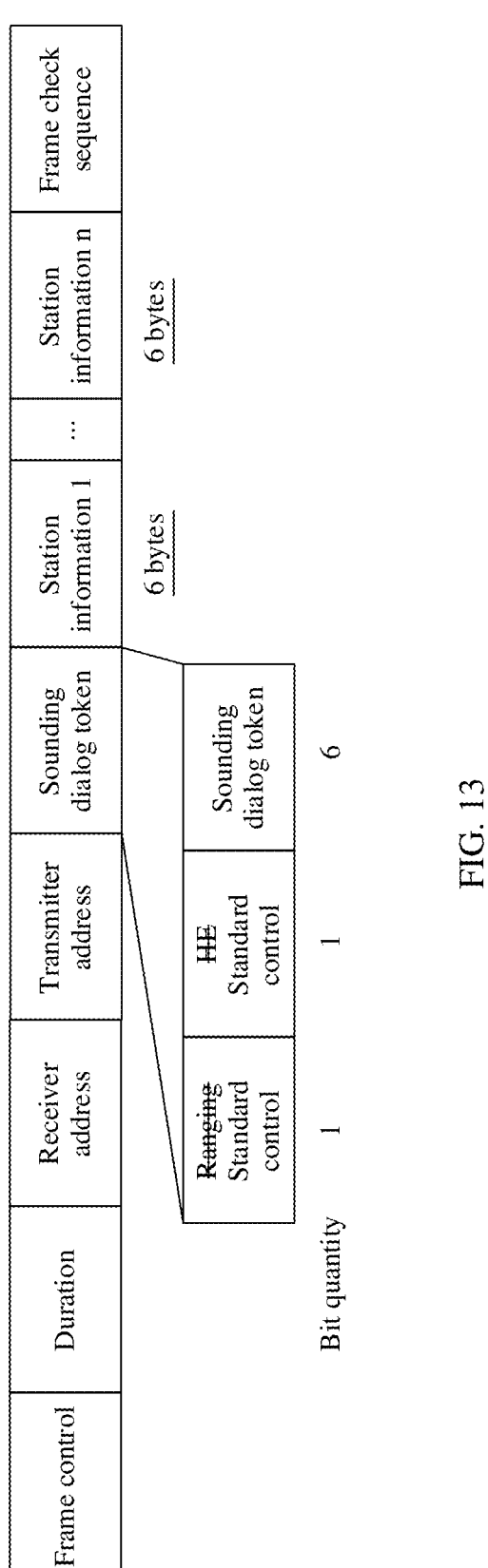
FIG. 13 shows a frame structure of an NDPA frame according to an embodiment of this application.

The following describes an improved NDPA frame with reference to a specific example. FIG. 13 shows a frame structure of an NDPA frame according to an embodiment of this application. As shown in FIG. 13, the NDPA frame may include a frame control (frame control) field, a duration (duration) field, a receiver address (receive address, RA) field, a transmitter address (transmitter address, TA) field, a sounding dialog token (sounding dialog token) field, a station information (station information, STA Info) field, a frame check sequence (frame check sequence, FCS) field, and the like. The frame control field, the duration field, the receiver address field, the transmitter address field, and the frame check sequence field may be consistent with those in the existing IEEE 802.11. This application focuses on improvement of the sounding dialog token field and the station information field.

First, an improved NDPA frame may indicate a type of an NDPA, for example, an EHT NDPA frame, a VHT NDPA frame, an HE NDPA frame, or a ranging (Ranging) NDPA frame.

In some possible implementations, functions of bits of the ranging field and the HE field in the sounding dialog token field in IEEE 802.11 are redefined in this embodiment of this application, to indicate the type of the NDPA frame based on the bits. Before the functions are redefined, when values of the ranging field and the HE field are 10, it indicates that the NDPA frame is a ranging NDPA frame; or when values of the ranging field and the HE field are 01, it indicates that the NDPA frame is an HE NDPA frame. After the functions are redefined, the functions of the bits of the ranging field and the HE field are changed to those of a standard control (standard control) field. For example, as shown in FIG. 13, the $1^{st}$ bit and the $2^{nd}$ bit of the sounding dialog token field in IEEE 802.11 are redefined in this application.

There are many implementations of the standard control field in this embodiment of this application.

Implementation 1

As shown in Table 1, the standard control field includes two bits. When a value of the standard control field is 00, it indicates that the NDPA frame is a VHT NDPA frame or an EHT NDPA frame. In this case, the VHT NDPA frame and the EHT NDPA frame need to be further distinguished based on an improved station information field. In this case, after receiving the NDPA frame, the second communication device is required to further obtain a value of a related bit in at least one station information field when learning that the value of the standard control field is 00, so as to determine a specific type of the NDPA frame. In an example, one bit in the station information field may be occupied, and the bit is used to further indicate whether the NDPA frame is a VHT NDPA frame or an EHT NDPA frame. For example, a new disambiguation (disambiguation) field may be set in the station information field. When a value of the disambiguation field is 0, it indicates that the NDPA frame is a VHT NDPA frame; or when a value of the disambiguation field is 1, it indicates that the NDPA frame is an EHT NDPA frame. Alternatively, when a value of the disambiguation field is 1, it indicates that the NDPA frame is a VHT NDPA frame; or when a value of the disambiguation field is 0, it indicates that the NDPA frame is an EHT NDPA frame. For another example, one bit in an association identifier field may be used to further indicate whether the NDPA frame is a VHT NDPA frame or an EHT NDPA frame. When a value of the bit is 0, it indicates that the NDPA frame is a VHT NDPA frame; or when a value of the bit is 1, it indicates that the NDPA frame is an EHT NDPA frame. Alternatively, when a value of the bit is 1, it indicates that the NDPA frame is a VHT NDPA frame; or when a value of the bit is 0, it indicates that the NDPA frame is an EHT NDPA frame. For another example, a value of a special association identifier may be used to further indicate whether the NDPA frame is a VHT NDPA frame or an EHT NDPA frame. For example, when the value of the association identifier is 2044, it indicates that the NDPA frame is a VHT NDPA frame; or when the value of the association identifier is 2043, it indicates that the NDPA frame is an EHT NDPA frame.

When a value of the standard control field is 01, it indicates that the NDPA frame is an HE NDPA frame. In this case, a meaning of the standard control field is compatible and consistent with that in IEEE 802.11ax.

When a value of the standard control field is 10, it indicates that the NDPA frame is a ranging NDPA frame. In this case, a meaning of the standard control field is compatible and consistent with that in IEEE 802.11az.

When a value of the standard control field is 11, it indicates that the NDPA frame is invalid or reserved for future use.

TABLE 1

| Implementation 1 of a standard control field | | |
|---|---|---|
| Value of a standard control field | | Meaning |
| 0 | 0 | VHT NDPA or EHT NDPA |
| 0 | 1 | HE NDPA |
| 1 | 0 | Ranging NDPA |
| 1 | 1 | Invalid or reserved |

Implementation 2

As shown in Table 2, the standard control field includes two bits. When a value of the standard control field is 00, it indicates that the NDPA frame is a VHT NDPA frame. When a value of the standard control field is 01, it indicates that the NDPA frame is an HE NDPA frame. In this case, a meaning of the standard control field is compatible and consistent with that in IEEE 802.11ax. When a value of the standard control field is 10, it indicates that the NDPA frame is an EHT NDPA frame. When a value of the standard control field is 11, it indicates that the NDPA frame is a ranging NDPA frame.

TABLE 2

| Implementation 2 of a standard control field | | |
|---|---|---|
| Value of a standard control field | | Meaning |
| 0 | 0 | VHT NDPA |
| 0 | 1 | HE NDPA |
| 1 | 0 | EHT NDPA |
| 1 | 1 | Ranging NDPA |

It should be understood that Implementation 1 and Implementation 2 of the standard control field are merely examples, and there are still many other possible implementations of the standard control field. For example, when a value of the standard control field is 00, it indicates that the NDPA frame is a VHT NDPA frame. When a value of the standard control field is 01, it indicates that the NDPA frame is an HE NDPA frame. In this case, a meaning of the standard control field is compatible and consistent with that in IEEE 802.11ax. When a value of the standard control field is 10, it indicates that the NDPA frame is a ranging NDPA frame. When a value of the standard control field is 11, it indicates that the NDPA frame is an EHT NDPA frame. For another example, when a value of the standard control field is 00, it indicates that the NDPA frame is an EHT NDPA frame. When a value of the standard control field is 01, it indicates that the NDPA frame is an HE NDPA frame. In this case, a meaning of the standard control field is compatible and consistent with that in IEEE 802.11ax. When a value of the standard control field is 10, it indicates that the NDPA frame is a ranging NDPA frame. When a value of the standard control field is 11, it indicates that the NDPA frame is a VHT NDPA frame.

This method can avoid confusing stations when a size of an EHT station information field is extended.

2. Improved Station Information Field

In this embodiment of this application, a length of the station information field is extended from four bytes to six bytes. The station information field has many implementation forms, provided that the station information field can directly or indirectly indicate an antenna set on which channel sounding needs to be performed by the second communication device. This is not specifically limited in this embodiment of this application.

Figure 14:
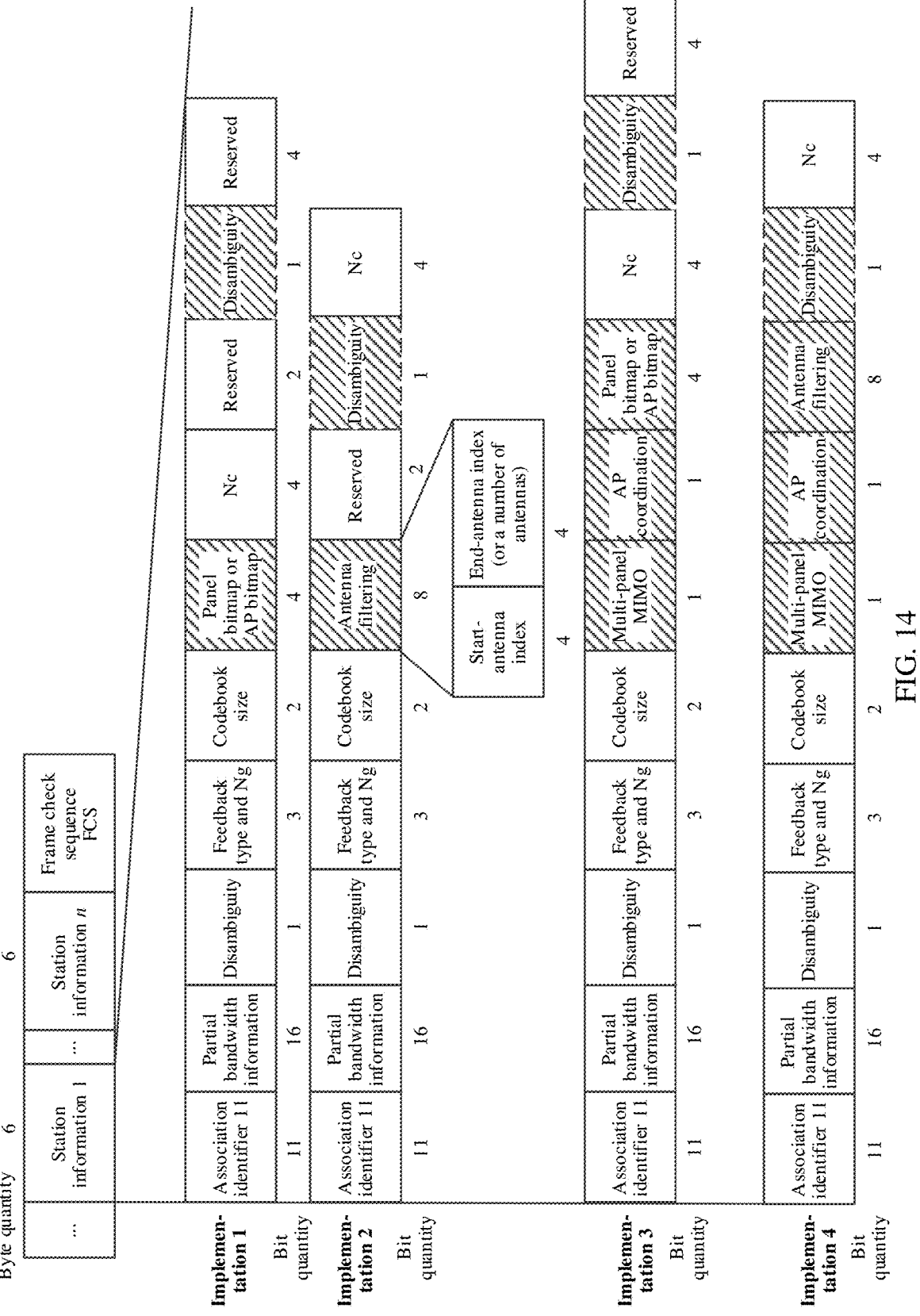
FIG. 14 is a schematic diagram of an implementation of a station information field in an NDPA frame according to an embodiment of this application.

FIG. 14 shows four implementations of the station information field.

Implementation 1

In an MP MIMO scenario, functions of fields such as an association identifier 11, partial bandwidth information (Partial BW Info), the $1^{st}$ disambiguation (disambiguation) field, a feedback type and Ng (feedback type and Ng), a codebook size (codebook size), and a number of columns (Nc) may be consistent with functions of corresponding fields of an HE NDPA in IEEE 802.11ax, except for a difference between a bit quantity of a part of fields and a bit quantity of corresponding fields in the HE NDPA in IEEE 802.11ax. The following focuses on newly introduced functions.

The improved station information field includes a bitmap field occupying several bits (for example, four bits shown in FIG. 14). The bitmap field is used to indicate a part of antennas or a part of APs on which channel sounding needs to be performed by the second communication device. The bitmap field may correspond to the foregoing first field. For example, in an MP MIMO scenario, the field represents a panel bitmap, and each bit represents one panel. For another example, in a multi-AP coordination scenario, the field represents an AP bitmap, and each bit represents one AP. In this way, specific panels or APs that need to be measured by a specific STA may be determined based on both the association identifier 11 and the bitmap field in the station information field.

In addition, the improved station information field may further include a new disambiguation field used to further determine the type of the NDPA frame. The new disambiguation field and the foregoing standard control field may jointly constitute the foregoing third field. Optionally, the new disambiguation field may be any bit following bit 32 (that is, the 33$^{rd}$ bit counted from 0) of the station information field, for example, bit 43 (that is, the 44$^{th}$ bit counted from 0) shown in FIG. 14. When a value of the disambiguation field is 0, it indicates that the NDPA frame is a VHT NDPA frame; or when a value of the disambiguation field is 1, it indicates that the NDPA frame is an EHT NDPA frame. Alternatively, when a value of the disambiguation field is 1, it indicates that the NDPA frame is a VHT NDPA frame; or when a value of the disambiguation field is 0, it indicates that the NDPA frame is an EHT NDPA frame.

It should be understood that when Implementation 1 of the improved station information field is used with reference to Implementation 2 of the standard control field, the new disambiguation field may be used in the improved station information field to further determine the type of the NDPA frame, or the new disambiguation field may not be set.

It should be understood that Implementation 2 is also applicable to a multi-AP coordination scenario.
Implementation 2

For MP MIMO, in Implementation 2, functions of fields, such as an association identifier 11, partial bandwidth information, the 1$^{st}$ disambiguation field, a feedback type and Ng, a codebook size, and a number of columns, that are included in the improved station information field are the same as those in Implementation 1, except for a change in a location of a part of fields. The following describes only a difference in function. In Implementation 2, the improved station information field includes no bitmap field, and but includes an antenna filtering field occupying several bits (for example, eight bits in FIG. 14). The antenna filtering field may correspond to the foregoing first field. The antenna filtering field includes a start-antenna index field and an end-antenna index field. In this way, it may be determined, based on both the association identifier 11 and the antenna filtering field in the station information field, that a specific STA needs to measure an antenna.

Optionally, the end-antenna index field in the antenna filtering field may be replaced with an antenna quantity field.

It should be understood that Implementation 2 is also applicable to a multi-AP coordination scenario.
Implementation 3

In MP MIMO and multi-AP coordination scenarios, in Implementation 3, functions of fields, such as an association identifier 11, partial bandwidth information, the 1$^{st}$ disambiguation field, a feedback type and Ng, a codebook size, and a number of columns, that are included in the improved station information field are the same as those in Implementation 1, except for a change in a location of a part of fields. The following describes only a difference in function. In Implementation 3, several bits are used based on Implementation 1 to indicate whether a bitmap field is specifically a panel bitmap or an AP bitmap, and a field including these bits may correspond to the foregoing second field.

For example, as shown in FIG. 14, a 1-bit multi-panel MIMO field and a 1-bit AP coordination field are introduced based on Implementation 1. If values of the two bits are 10, the two bits represent multi-panel MIMO, and a subsequent bitmap field represents a panel bitmap. If values of the two bits are 01, the two bits represent multi-AP coordination, and a subsequent bitmap field represents an AP bitmap. If values of the two bits are 00, the two bits represent a general EHT station information field, and a subsequent bitmap field is a reserved field. If values of the two bits are 11, the two bits are reserved for future functions.

For another example, based on Implementation 1, one bit is introduced to indicate whether the bitmap field is a panel bitmap or an AP bitmap. For example, when a value of the bit is 1, the bitmap field represents a panel bitmap; or when a value of the bit is 0, the bitmap field represents an AP bitmap. For another example, when a value of the bit is 0, the bitmap field represents a panel bitmap; or when a value of the bit is 1, the bitmap field represents an AP bitmap.
Implementation 4

In MP MIMO and multi-AP coordination scenarios, most functions in Implementation 4 are the same as those in Implementation 2, except for a change in a location of a part of fields. The following describes only a difference in function. In Implementation 4, based on Implementation 2, several bits are used to indicate whether the bitmap field is specifically a panel bitmap or an AP bitmap, and a field including these bits may correspond to the foregoing second field.

For example, as shown in FIG. 14, a 1-bit multi-panel MIMO field and a 1-bit AP coordination field are introduced based on Implementation 1. Functions of the two bits are similar to those in Implementation 3. Details are not described herein again.

For another example, based on Implementation 1, one bit is introduced to indicate whether the bitmap field is a panel bitmap or an AP bitmap. Functions of this bit are similar to those in Implementation 3. Details are not described herein again.

In addition, the first frame in this embodiment of this application may be a new control frame introduced in IEEE 802.11, and functions of the first frame for an MP MIMO scenario or a multi-AP coordination scenario are implemented by using a frame type or a subtype (subtype) that is not used in a frame control field in existing IEEE 802.11. For example, the frame type field is 01, and the subtype field is 1111. The new control frame has functions similar to those of the foregoing improved NDPA frame. Because the new control frame is dedicated for the MP MIMO scenario or the AP coordination scenario, the new disambiguation field described above may not be set in the new control frame.

It may be understood that implementations of the first frame are merely examples, and there may alternatively be other implementations of the first frame. For example, each field in the first frame may alternatively have other names. For another example, each field in the first frame may alternatively be a field of another length. For another example, the fields in the first frame may be arranged in another order. For another example, the first frame may alternatively include more or fewer fields.

There may be many implementations of the improved NDP frame in this embodiment of this application, provided that functions of the second frame can be implemented.

In an example, the improved NDP frame includes fields related to legacy channel sounding, for example, a non-high-throughput short training field (non-high-throughput short training field, L-STF), a non-high-throughput long training field (non-high-throughput long training field, L-LTF), and a non-high-throughput signal field (non-high-throughput signal field, L-SIG). The improved NDP frame further includes a part of EHT-specific fields, for example, an extremely high throughput short training field (extremely high throughput short training field, EHT-STF), an extremely high throughput long training field (extremely high throughput long training field, EHT-SIG), and an extremely high throughput signal field (extremely high throughput signal field, EHT-SIG).

There are many implementations of the EHT-specific field in the improved NDP frame. This is not specifically limited in this embodiment of this application.

Implementation 1

Figure 15:
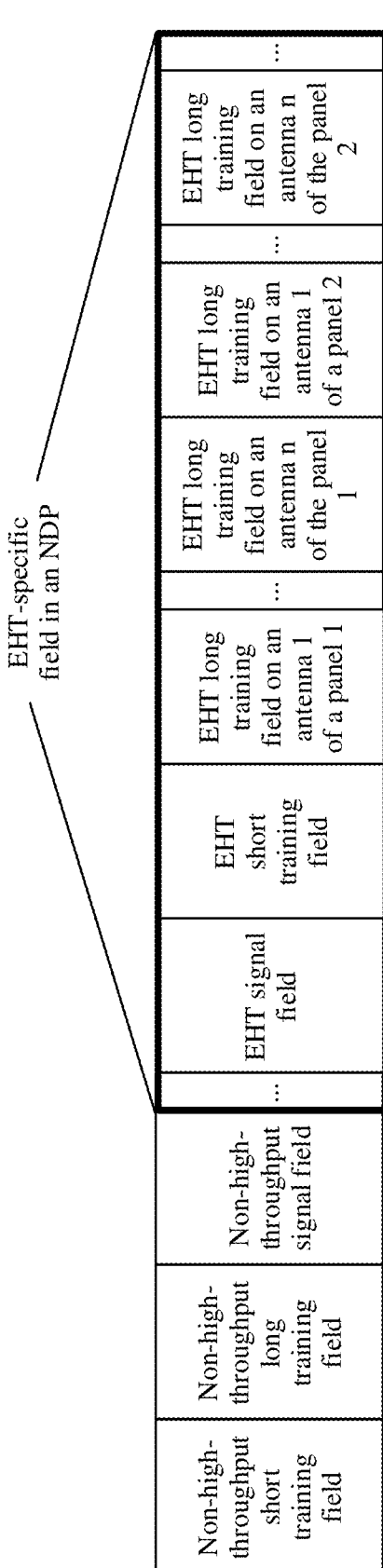
FIG. 15 is a schematic diagram of an implementation of an NDP frame according to an embodiment of this application.

As shown in FIG. 15, the EHT-specific field includes an ETH-SIG, an ETH-STF, and ETH-LTFs. ETH-LTFs of antennas are sequentially arranged based on panel indexes and antenna indexes. It can be learned that, in Implementation 1, the EHT-LTFs of the antennas are sent panel by panel and antenna by antenna. For example, antennas mounted on a panel 1 are traversed for sending, and then antennas mounted on a panel 2 are traversed for sending. This method is applied by analogy.

It may be understood that a panel sorting method and an antenna sorting method are not limited in this embodiment of this application.

Implementation 2

Figure 16:
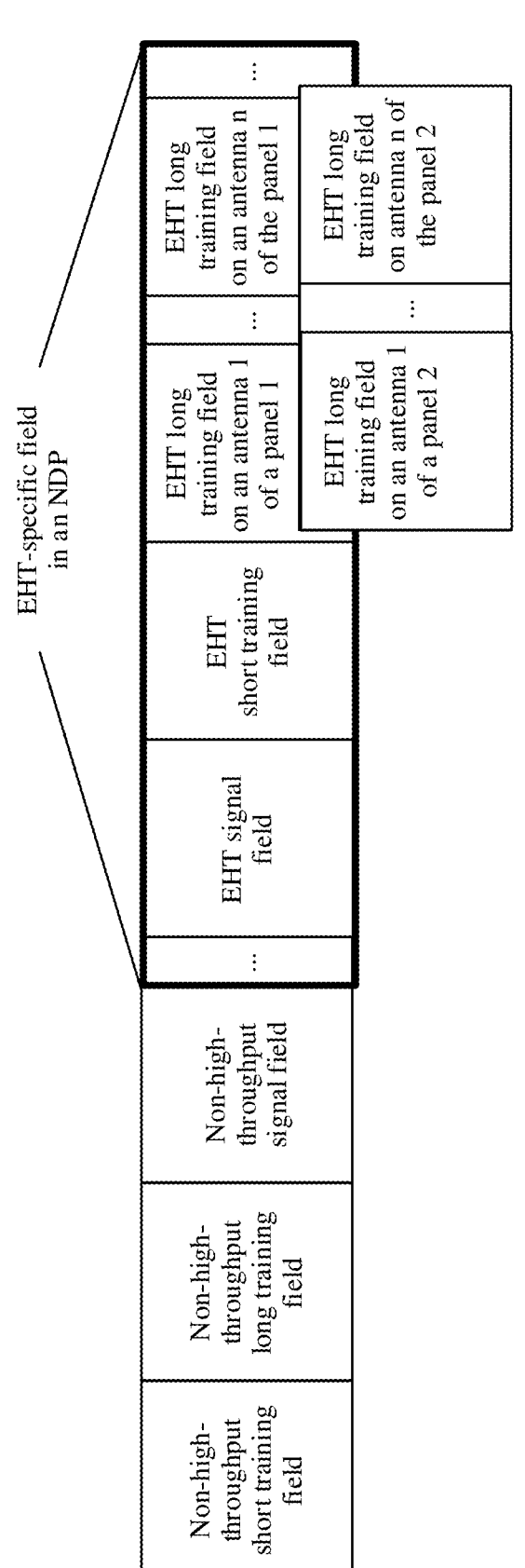
FIG. 16 is a schematic diagram of another implementation of an NDP frame according to an embodiment of this application.

As shown in FIG. 16, the EHT-specific field includes an ETH-SIG, an ETH-STF, and ETH-LTFs. The ETH-LTFs include only EHT-LTFs of a plurality of antennas on one panel. The ETH-LTFs of the plurality of antennas may be sequentially arranged based on antenna indexes. A difference from Implementation 1 lies in that EHT-LTFs of all panels are sent simultaneously. However, the EHT-LTFs of all the panels are sent serially in Implementation 1. For example, when antennas mounted on a panel 1 are traversed for sending, antennas mounted on a panel 2 are also traversed for sending.

It may be understood that a panel sorting method and an antenna sorting method are not limited in this embodiment of this application.

Implementation 3

As shown in FIG. 17, Implementation 3 is similar to Implementation 1, and a difference lies in that NDP frames of all panels are sequentially and independently sent, and there is an interval of a fourth preset time period between NDP frames of two adjacent panels. The fourth preset time period may be any time length, for example, one or more SIFSs.

It should be noted that the foregoing implementations of the improved NDP frame may be applied to different scenarios, for example, an MP MIMO scenario and a multi-AP coordination scenario.

The antenna set mentioned above may be an antenna that is predetermined by the first communication device and that can well communicate with the second communication device. The following describes a corresponding determining method.

FIG. 18 is a schematic diagram of a panel pre-training procedure according to an embodiment of this application.

As shown in FIG. 18, in step 1, an AP sends a training frame to a part or all of non-AP STAs.

Optionally, as shown in FIG. 18, an improved NDP frame may be reused as a training frame. The improved NDP frame is similar to the foregoing improved NDP frame, and a difference lies in that all antennas of each panel of the AP send an EHT-LTF signal simultaneously, instead of sending an EHT-LTF signal by the antennas one by one.

Optionally, as shown in FIG. 19, the training frame may alternatively be a plurality of continuously sent improved NDP frames, each improved NDP frame corresponds to one panel, and each improved NDP frame is sent by all antennas of the corresponding panel simultaneously. There is an interval of a fifth preset time period between two adjacent improved NDP frames. The fifth preset time period may be any time length, for example, one or more SIFSs.

Optionally, before the AP sends the improved NDP frame to the part or all of the non-AP STAs, the AP may further send a pre-training frame to all or the part of the non-AP STAs. The foregoing improved NDPA frame may be reused as the pre-training frame, and a difference lies in that one or more bits in the improved NDPA frame need to be occupied to indicate that the NDPA frame is an NDPA frame for pre-training.

For example, one bit in the reserved field in the four implementations shown in FIG. 14 is changed into an NDPA type field. When a value of the bit is 1, it indicates that the NDPA frame is used for pre-training; or when a value of the bit is 0, it indicates that the NDPA frame is used for channel sounding. Alternatively, when a value of the bit is 0, it indicates that the NDPA frame is used for pre-training; or when a value of the bit is 1, it indicates that the NDPA frame is used for channel sounding.

Step 2: The non-AP STA receives the training frame sent by the AP, and determines one or more target panels based on a preset indicator. Optionally, the one or more target panels can well communicate with a STA. The preset indicator may be any indicator for measuring communication quality. For example, the preset indicator may be one or more of indicators such as a received signal strength indicator (received signal strength indicator, RSSI) and a signal to interference plus noise ratio (signal to interference and noise ratio, SINR).

Step 3: The AP sends a panel training trigger frame to the part or all of the non-AP STAs, to schedule a corresponding non-AP STA to feed back a target panel determined by the non-AP STA. In some embodiments, the panel training trigger frame may further indicate a maximum value of a quantity of panels allowed to be fed back. For example, the panel training trigger frame indicates that the maximum value of the quantity of panels allowed to be fed back is 4, 5, 8, 11, 12, or the like.

FIG. 20 shows a frame structure of a plane training trigger frame. The trigger frame shown in FIG. 20 is a new type of trigger frame introduced based on a trigger frame structure in IEEE 802.11ax. The trigger frame includes at least a trigger frame type field and a common information field. The trigger frame type field is used to indicate a type of the trigger frame. For example, when a value of the trigger frame type field is 9, it indicates that the type of the trigger frame is a panel training trigger frame. The common information field is a field related to the trigger type. For example, when the type of the trigger frame is a panel training trigger frame, the common information field may indicate a maximum value of a quantity of panels allowed to be fed back, that is, a maximum quantity of planes that can be fed back by a non-AP STA.

It may be understood that the maximum value of the quantity of panels allowed to be fed back may also be indicated by using a pre-training frame and/or a training frame, or the maximum value of the quantity of panels allowed to be fed back may be agreeing that no interaction is required. This is not specifically limited in this embodiment of this application.

Step 4: The non-AP STA sends a feedback frame on a resource allocated to the non-AP STA or on a resource obtained based on random contention, where the feedback frame is used to feed back one or more target panels determined by the non-AP STA.

Optionally, the feedback frame may be implemented by defining a new A-control frame (A-Control) type in IEEE 802.11ax. The control identifier field (Control ID) may use any reserved type, for example, a type corresponding to a value 7. A structure of the control information field (control information) may be shown in FIG. 21. The control information field includes a number of panels field and a panel identifier field. A value of the number of panels field plus 1 is equal to a quantity of panels fed back this time, and the number of panels field is followed by an identifier of each panel.

Optionally, when the quantity of panels fed back is an agreed value, the control information field may not include a number of panels field.

In the foregoing training process, the AP can learn of a target panel fed back by each STA, that is, learn of an antenna set corresponding to each STA.

In some embodiments, as shown in FIG. 22, the training frame may be sent through orthogonal frequency division multiple access (orthogonal frequency division multiple access, OFDMA). Alternatively, as shown in FIG. 23, the training frame may be sent through multi-user multiple-input multiple-output (multiple user multiple input multiple output, MU-MIMO). In this case, the training frame needs to include only a panel identifier.

In a multi-AP coordination scenario, in addition to the training process shown in FIG. 18, a training procedure between APs further needs to be performed. A multi-AP training procedure with a plurality of panels may be shown as follows.

Step 1: A primary AP in a multi-AP coordination group sends a pre-training frame to all secondary APs.

Step 2: The primary AP sends a training frame to all secondary APs.

Step 3: The primary AP sends a trigger frame to all the secondary APs.

Step 4: The secondary AP sends a feedback frame on a resource allocated to the secondary AP or on a resource obtained based on random contention, where the feedback frame includes one or more optimal service panels that are between the secondary AP and the primary AP and that are selected by the secondary AP, and a status of interference between the secondary AP and each STA. The status of interference between the secondary AP and each STA may be obtained in the training process shown in FIG. 18, or may be obtained in another manner. This is not specifically limited in this embodiment of this application.

Figure 24:
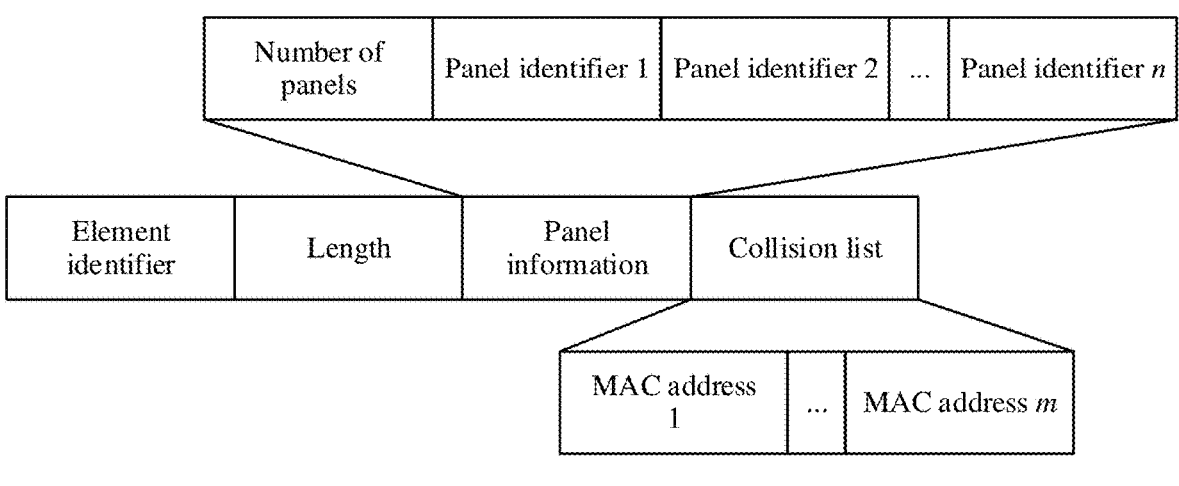
FIG. 24 shows another frame structure of a feedback frame according to an embodiment of this application.

FIG. 24 shows a frame structure of a feedback frame between a plurality of APs with a plurality of panels. As shown in FIG. 24, the feedback frame includes an element identifier field, a length field, a panel information field, and a collision list field. The panel information field is used to indicate one or more optimal service panels between a secondary AP and a primary AP. The collision list field is used to indicate an interference status between the secondary AP and each STA. For example, the collision list field indicates a media access control (media access control, MAC) address of a STA having an interference relationship with the secondary AP, a MAC address of a STA having no interference relationship with the secondary AP, or the like.

It should be understood that embodiments described in this specification may be independent solutions, or may be combined based on internal logic. These solutions all fall within the protection scope of this application.

It may be understood that, to implement functions in the foregoing embodiments, the first communication device and the second communication device each include a corresponding hardware structure and/or software module for performing each function. A person of ordinary skill in the art should easily be aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 25:
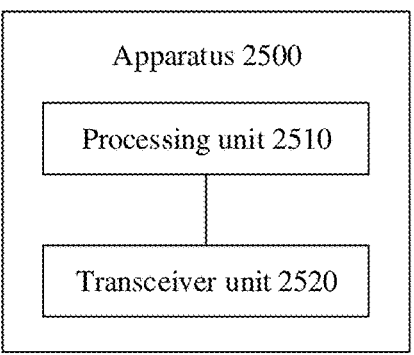
FIG. 25 is a schematic diagram of a structure of a channel sounding apparatus according to an embodiment of this application.
Figure 26:
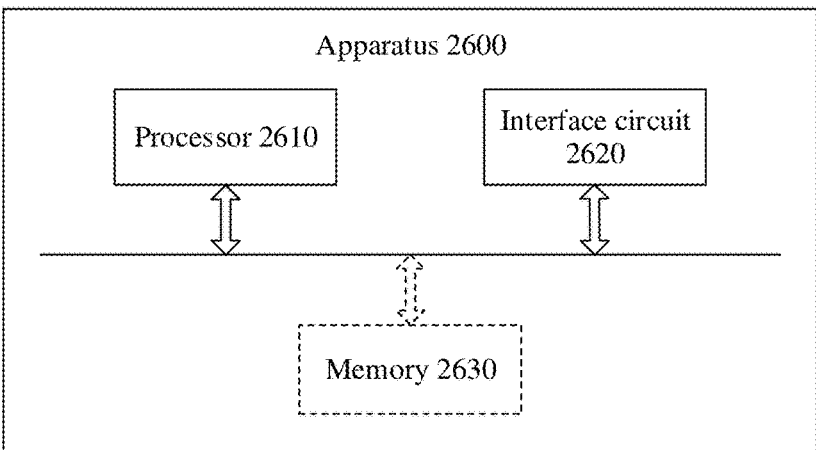
FIG. 26 is a schematic diagram of another structure of a channel sounding apparatus according to an embodiment of this application.

FIG. 25 and FIG. 26 are schematic diagrams of structures of possible channel sounding apparatuses according to embodiments of this application. These apparatuses may be configured to implement functions of the first communication device or the second communication device in the foregoing method embodiments, and therefore may also implement beneficial effects of the foregoing method embodiments. In embodiments of this application, the channel sounding apparatus may be the AP 1 shown in FIG. 1, may be the STA 1 or the STA 2 shown in FIG. 1, or may be a module (for example, a chip) used in an AP or a STA.

As shown in FIG. 25, an apparatus 2500 includes a processing unit 2510 and a transceiver unit 2520. The apparatus 2500 is configured to implement the functions of the first communication device or the second communication device in any one of the foregoing method embodiments.

When the apparatus 2500 is configured to implement the functions of the first communication device in the method embodiments, the transceiver unit 2520 is configured to send a first frame to the second communication device, where the first frame is used to indicate the second communication device to perform channel sounding on a part of antennas of the first communication device. The transceiver unit 2520 is further configured to send a second frame to the second communication device, where the second frame is used by the second communication device to perform channel sounding on the part of antennas. The transceiver unit 2520 is further configured to receive a third frame from the second communication device, where the third frame is used to indicate a result of performing channel sounding on the part of antennas.

Alternatively, the transceiver unit 2520 is configured to send a first frame to the second communication device, where the first frame is used to indicate the second communication device to perform channel sounding on a part of communication devices in a communication device group to which the first communication device belongs. The transceiver unit 2520 is further configured to send a second frame to the second communication device, where the second frame is used by the second communication device to perform channel sounding on the part of communication devices. The transceiver unit 2520 is further configured to receive a third frame from the second communication device, where the third frame is used to indicate a result of performing channel sounding on the part of communication devices.

When the apparatus 2500 is configured to implement the functions of the second communication device in the method embodiments, the transceiver unit 2520 is configured to receive a first frame from the first communication device, where the first frame is used to indicate the second communication device to perform channel sounding on a part of antennas of the first communication device. The transceiver unit 2520 is further configured to receive a second frame sent by the first communication device, where the second frame is used by the second communication device to perform channel sounding on the part of antennas. The processing unit 2510 is configured to perform channel sounding on the part of antennas based on the second frame. The transceiver unit 2520 is further configured to send a third frame to the first communication device, where the third frame is used to indicate a result of performing channel sounding on the part of antennas.

Alternatively, the transceiver unit 2520 is configured to receive a first frame from the first communication device, where the first frame is used to indicate the second communication device to perform channel sounding on a part of communication devices in a communication device group to which the first communication device belongs. The transceiver unit 2520 is further configured to receive a second frame sent by the first communication device, where the second frame is used by the second communication device to perform channel sounding on the part of communication devices. The processing unit 2510 is configured to perform channel sounding on the part of communication devices based on the second frame. The transceiver unit 2520 is further configured to send a third frame to the first communication device, where the third frame is used to indicate a result of performing channel sounding on the part of communication devices.

For more detailed description about the processing unit 2510 and the transceiver unit 2520, refer to related description in the method embodiments directly. Details are not described herein again.

As shown in FIG. 26, an apparatus 2600 includes a processor 2610 and an interface circuit 2620. The processor 2610 and the interface circuit 2620 are coupled to each other. It may be understood that the interface circuit 2620 may be a transceiver or an input/output interface. Optionally, the apparatus 2600 may further include a memory 2630, configured to store instructions executed by the processor 2610, store input data required by the processor 2610 to run instructions, or store data generated after the processor 2610 runs instructions.

When the apparatus 2600 is configured to implement the foregoing methods, the processor 2610 is configured to perform functions of the processing unit 2510, and the interface circuit 2620 is configured to perform functions of the transceiver unit 2520.

When the apparatus is a chip used in the first communication device, the chip implements the functions of the first communication device in the foregoing method embodiments. The chip receives information from another module (for example, a radio frequency module or an antenna) of the first communication device, where the information is sent by the second communication device to the first communication device. Alternatively, the chip sends information to another module (for example, a radio frequency module or an antenna) of the first communication device, where the information is sent by the first communication device to the second communication device.

When the apparatus is a chip used in the second communication device, the chip implements the functions of the second communication device in the foregoing method embodiments. The chip receives information from another module (for example, a radio frequency module or an antenna) of the second communication device, where the information is sent by the first communication device to the second communication device. Alternatively, the chip sends information to another module (for example, a radio frequency module or an antenna) of the second communication device, where the information is sent by the second communication device to the first communication device.

It should be noted that the processor in embodiments of this application may be a central processing unit (Central Processing Unit, CPU), may be another general-purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, a transistor logic device, a hardware component, or any combination thereof. The general-purpose processor may be a microprocessor or any conventional processor.

The method steps in embodiments of this application may be implemented by using hardware, or may be implemented by executing software instructions by the processor. The software instructions may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk drive, a removable hard disk, a CD-ROM, or any other form of storage medium well-known in the art. For example, a storage medium is coupled to the processor, so that the processor can read information from the storage medium and can write information into the storage medium. Certainly, the storage medium may be a component of the processor. The processor and the storage medium may be located in an ASIC. In addition, the ASIC may be located in a network device or a terminal device. Certainly, the processor and the storage medium may alternatively exist in a network device or a terminal device as discrete components.

All or a part of the foregoing embodiments may be implemented by using software, hardware, firmware, or any combination thereof. When the software is used to implement embodiments, all or a part of the embodiments may be implemented in a form of a computer program product. The computer program product includes one or more computer programs or instructions. When the computer programs or instructions are loaded and executed on a computer, all or a part of the procedures or functions according to embodiments of this application are generated. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semi-conductor medium, for example, a solid-state disk (solid state disk, SSD).

It should be noted that in embodiments of this application, a "protocol" may be a standard protocol in the communication field, for example, may include an LTE protocol, an NR protocol, a WLAN protocol, and a related protocol applied to a subsequent communication system. This is not limited in this application.

It should be further noted that, in embodiments of this application, "pre-obtaining" may include indication through device signaling or predefinition, for example, definition in a protocol. "Predefinition" may be implemented by prestoring corresponding code or a table in a device (for example, the device includes a station and an access point), or may be implemented in another manner that may be used to indicate related information. A specific implementation of "predefinition" is not limited in this application. For example, "predefinition" may be "predefinition in a protocol".

It should be further noted that "storing" in embodiments of this application may refer to storing in one or more memories. The one or more memories may be separately disposed, or may be integrated into an encoder, a decoder, a processor, or a communication apparatus. Alternatively, a part of the one or more memories may be separately disposed, and a part of the one or more memories are integrated into a translator, a processor, or a communication apparatus. A type of the memory may be a storage medium in any form, and this is not limited in this application.

It should be further noted that in embodiments of this application, "of (of)", "corresponding (corresponding, relevant)", and "corresponding (corresponding)" are interchangeable sometimes. It should be noted that, when differences between the terms are not emphasized, meanings of the terms are the same.

It should be noted that the term "and/or" describes an association relationship for describing associated objects and represents that three relationships may exist. For example, A and/or B may represent the following three cases: Only A exists, both A and B exist, and only B exists. The character "I" usually indicates an "or" relationship between associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

In embodiments of this application, unless otherwise stated or there is a logic collision, terms and/or descriptions between different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined according to functions and internal logic of the processes.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate. Components displayed as units may or may not be physical units, in other words, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on this understanding, the technical solutions of this application essentially, or the part contributing to the prior art, or a part of the technical solutions may be implemented in a form of a software product. The computer software product is stored in a storage medium, and includes several instructions for instructing a computer device (which may be, for example, a personal computer, a server, or a network device) to perform all or a part of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel sounding method, comprising:

sending, by a first communication device, a first frame to a second communication device, wherein the first frame indicates the second communication device to perform channel sounding on a part of antennas of the first communication device;

sending, by the first communication device to the second communication device, a second frame to be used by the second communication device to perform channel sounding on the part of the antennas; and receiving, by the first communication device, a third frame from the second communication device, wherein the third frame indicates a result of channel sounding performed on the part of the antennas, wherein in said sending the first frame to the second communication device, the first frame is sent on a portion, not an entirety, of the part of the antennas, and in said sending the second frame to the second communication device, the second frame is sent on the entirety of the part of the antennas.

2. The method according to claim 1, wherein, before the receiving the third frame from the second communication device, the method further comprises:

sending, by the first communication device, a fourth frame to the second communication device, wherein the fourth frame indicates the second communication device to send the third frame to the first communication device.

3. The method according to claim 1, wherein, before the sending the first frame to the second communication device, the method further comprises:

sending, by the first communication device to the second communication device, a training frame to be used by the second communication device to perform channel sounding on all the antennas of the first communication device;

receiving, by the first communication device, a feedback frame from the second communication device, the feedback frame responsive to the training frame; and determining, by the first communication device, the part of the antennas based on the feedback frame.

4. The method according to claim 3, wherein, before sending the training frame to the second communication device, the method further comprises:

sending, by the first communication device, a pre-training frame to the second communication device, wherein the pre-training frame indicates the second communication device to perform channel sounding on all the antennas of the first communication device.

5. The method according to claim 3, wherein, before receiving the feedback frame from the second communication device, the method further comprises:

sending, by the first communication device, a trigger frame to the second communication device, wherein the trigger frame indicates the second communication device to send the feedback frame to the first communication device.

6. The method according to claim 1, wherein the first frame comprises a first field, and the first field indicates a part of panels of the first communication device, and the part of the antennas comprises an antenna corresponding to the part of panels, or the first field carries an antenna index, and the antenna index indicates the part of the antennas.

7. The method according to claim 1, further comprising:

sending the first frame to a further communication device, wherein the first frame indicates the further communication device to perform channel sounding on a further part of the antennas of the first communication device, and the further part of the antennas does not overlap the part of the antennas on which channel sounding is to be performed by the second communication device;

sending the second frame to the further communication device to be used by the further communication device to perform channel sounding on the further part of the antennas; and receiving a further third frame from the further communication device, wherein the further third frame indicates a result of channel sounding performed on the further part of the antennas.

8. The method according to 7, wherein in said sending the first frame to the second communication device and to the further communication device, the first frame is sent jointly on the portion, not the entirety, of the part of the antennas, to the second communication device, and on a portion, not an entirety, of the further part of the antennas, to the further communication device, and in said sending the second frame to the second communication device and to the further communication device, the second frame is sent jointly on the entirety of the part of the antennas and on the entirety of the further part of the antennas.

9. The method according to claim 1, wherein the first frame comprises a first field and a second field, and the second field indicates that:

the first field indicates a part of panels of the first communication device, wherein the part of the antennas comprises an antenna corresponding to the part of panels, or the first field carries an antenna index, wherein the antenna index indicates the part of the antennas.

10. The method according to claim 1, wherein the first frame is a null data packet announcement (NDPA) frame, the first frame comprises a third field in a sounding dialog token field, and the third field comprises two bits;

a value 00 of the two bits indicates that the first frame is a frame of a very high throughput (VHT) variant;

a value 01 of the two bits indicates that the first frame is a frame of a high efficiency (HE) variant;

a value 10 of the two bits indicates that the first frame is a frame of a ranging variant; or a value 11 of the two bits indicates that the first frame is a frame of an extremely high throughput (EHT) variant.

11. The method according to claim 1, wherein the second frame comprises an extremely high throughput (EHT) signal field, an EHT short training field, and an EHT long training field, the part of the antennas corresponds to at least two antenna panels of the first communication device, the second frame comprises at least two second subframes, and the EHT long training field in one of the second subframes comprises a long training field of an antenna corresponding to one of the at least two antenna panels.

12. A channel sounding apparatus, the channel sounding apparatus being a first communication device and comprising:

antennas;

a memory, configured to store computer instructions; and a processor, configured to execute the computer instructions stored in the memory, to enable the channel sounding apparatus to perform:

sending a first frame to a second communication device, wherein the first frame indicates the second communication device to perform channel sounding on a first part of the antennas of the channel sounding apparatus;

sending, to the second communication device, a second frame to be used by the second communication device and the further communication device to perform channel sounding-on the first part of the antennas; and receiving a third frame from the second communication device, wherein the third frame from the second communication device indicates a result of channel sounding performed on the first part of the antennas, wherein in said sending the first frame to the second communication device, the first frame is sent on a portion, not an entirety, of the first part of the antennas, and in said sending the second frame to the second communication device, the second frame is sent on the entirety of the first part of the antennas.

13. The channel sounding apparatus according to claim 12, wherein the channel sounding apparatus is further enabled to perform, after said sending the second frame:

sending a fourth frame to the second communication device, wherein the fourth frame indicates the second communication device to send the third frame to the channel sounding apparatus.

14. The channel sounding apparatus according to claim 12, wherein the channel sounding apparatus is further enabled to perform, before said sending the first frame:

sending, to the second communication device, a training frame to be used by the second communication device to perform channel sounding on all the antennas of the channel sounding apparatus;

receiving a feedback frame from each of the second communication device, the feedback frame responsive to the training frame; and determining the first part of the antennas based on the feedback frame.

15. The channel sounding apparatus according to claim 14, wherein the channel sounding apparatus is further enabled to perform, before said sending the training frame:

sending a pre-training frame to the second communication device, wherein the pre-training frame indicates the second communication device to perform channel sounding on all the antennas of the channel sounding apparatus.

16. The channel sounding apparatus according to claim 14, wherein the channel sounding apparatus is further enabled to perform, after said sending the training frame:

sending a trigger frame to the second communication device, wherein the trigger frame indicates the second communication device to send the feedback frame to the channel sounding apparatus.

17. The channel sounding apparatus according to claim 12, wherein the first frame comprises a first field, and the first field indicates a first part of panels of the channel sounding apparatus, and the first part of the antennas comprises an antenna corresponding to the first part of panels, or the first field carries an antenna index, and the antenna index indicates the first part of the antennas.

18. The channel sounding apparatus according to claim 12, wherein the channel sounding apparatus is further enabled to perform sending the first frame to a further communication device, wherein the first frame indicates the further communication device to perform channel sounding on a second part of the antennas of the channel sounding apparatus, and the second part of the antennas does not overlap the first part of the antennas on which channel sounding is to be performed by the second communication device;

sending the second frame to the further communication device to be used by the further communication device to perform channel sounding on the second part of the antennas; and receiving a further third frame from the further communication device, wherein the further third frame indicates a result of channel sounding performed on the second part of the antennas, wherein in said sending the first frame to the second communication device and to the further communication device, the first frame is sent jointly on the portion, not the entirety, of the first part of the antennas, to the second communication device, and on a portion, not an entirety, of the second part of the antennas, to the further communication device, and in said sending the second frame to the second communication device and to the further communication device, the second frame is sent jointly on the entirety of the first part of the antennas and on the entirety of the second part of the antennas.

19. The channel sounding apparatus according to claim 12, wherein the first frame comprises a first field and a second field, and the second field indicates that:

the first field indicates a first part of panels of the channel sounding apparatus, wherein the first part of the antennas comprises an antenna corresponding to the first part of panels, or the first field carries an antenna index, wherein the antenna index indicates the first part of the antennas.

20. A non-transitory computer-readable storage medium, configured to store computer instructions, executable by a computer at a first communication device to enable the first communication device to perform:

sending a first frame to a second communication device, wherein the first frame indicates the second communication device to perform channel sounding on a part of antennas of the first communication device belongs;

sending to the second communication device a second frame to be used by the second communication device to perform channel sounding on the part of the antennas; and receiving a third frame from the second communication device, wherein the third frame indicates a result of channel sounding performed on the part of the antennas, wherein in said sending the first frame to the second communication device, the first frame is sent on a portion, not an entirety, of the part of the antennas, and in said sending the second frame to the second communication device, the second frame is sent on the entirety of the part of the antennas.

\* \* \* \* \*